United States Patent [19]
Castillo et al.

[11] 3,820,502
[45] June 28, 1974

[54] APPARATUS FOR FABRICATING WOODEN BUILDING FRAMES

[75] Inventors: Adolfo Castillo; Oscar Csakvary, both of Miami; John Calvin Jureit, Coral Gables, all of Fla.

[73] Assignee: Automated Building Components, Inc., Miami, Fla.

[22] Filed: Oct. 15, 1971

[21] Appl. No.: 189,642

Related U.S. Application Data

[62] Division of Ser. No. 25,536, April 3, 1970, Pat. No. 3,685,129.

[52] U.S. Cl. ............................ 118/6, 118/7, 118/42, 118/301
[51] Int. Cl. ........................ B05c 5/00, B05c 11/14
[58] Field of Search ............ 83/71, 153, 406; 118/6, 118/42, 301, 71, 37, 7, 40, 41

[56] References Cited
UNITED STATES PATENTS

| | | | |
|---|---|---|---|
| 2,571,976 | 10/1951 | Ward | 118/42 |
| 2,890,675 | 6/1959 | Cheever, Jr. | 118/6 |
| 2,898,242 | 8/1959 | Ott | 118/301 X |
| 2,916,801 | 12/1959 | Lyttle | 83/71 X |
| 3,230,925 | 1/1966 | Blanz | 118/37 X |
| 3,466,958 | 9/1969 | Munson | 83/71 |
| 3,599,689 | 8/1971 | Grant | 83/7 |

Primary Examiner—John P. McIntosh
Attorney, Agent, or Firm—LeBlanc & Shur

[57] ABSTRACT

The apparatus includes a numerically controlled automatic measuring, sawing and marking device for cutting lumber to predetermined lengths, such parts comprising the non-standard length parts of a wall frame, and marking the lumber parts forming the top and bottom plates of the wall frame to indicate the locations along such plates of the frame parts extending between the plates. The machine readable numerical information representing the non-standard lumber lengths is converted into visible instructions for establishing the position of a lumber stop relative to a saw for making lumber cuts of predetermined lengths. Machine readable numerical information representing the locations along the top and bottom plates of frame parts extending between the plates in terms of distances along the top and bottom plates from like ends thereof is converted into visible instructions for establishing the position of the lumber stop relative to a marking device and for controlling actuation of the marking device. The non-standard parts are assembled with the standard parts to form a wall frame in accordance with the markings on the plates establishing the locations of the parts extending between the plates. The markings are also coded to indicate the location of windows, doors, and tee and corner constructions along the plates.

7 Claims, 30 Drawing Figures

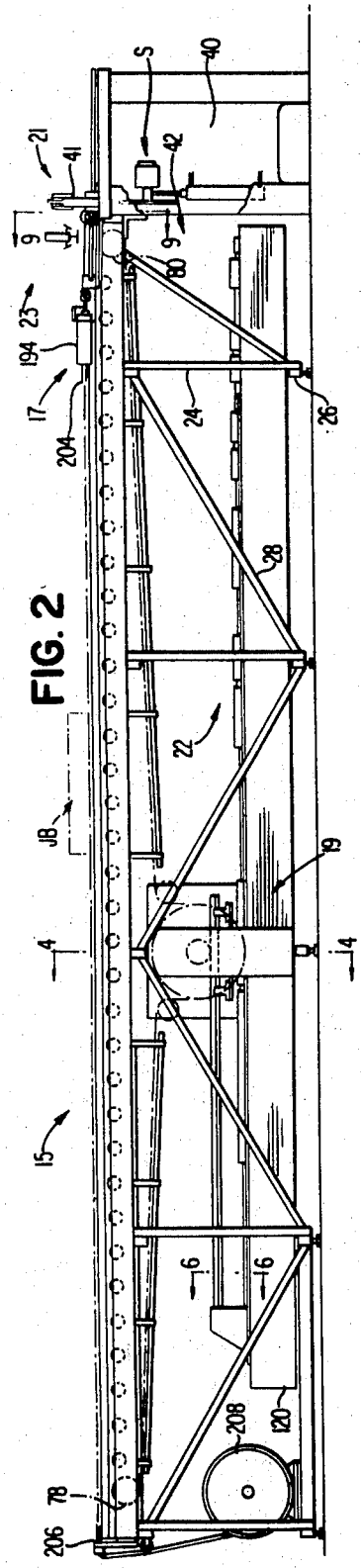

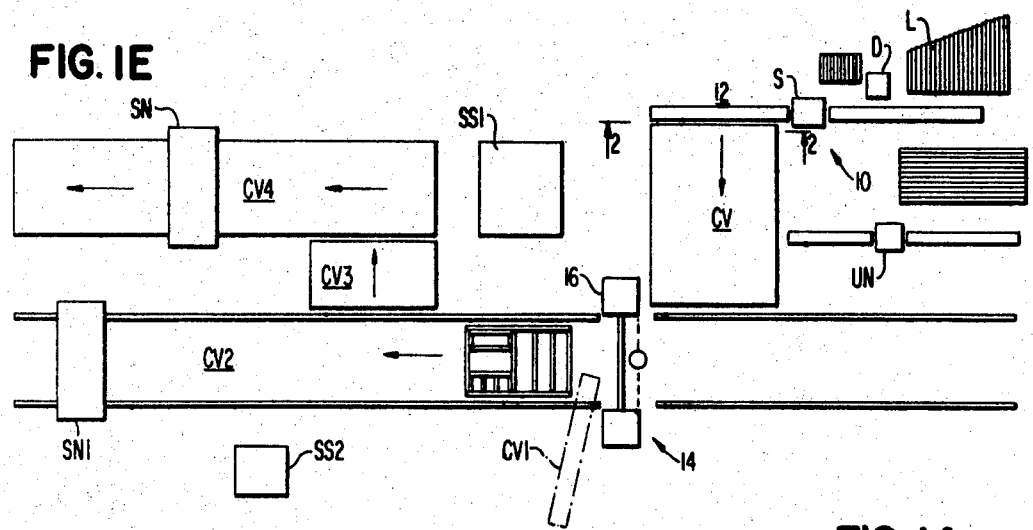

FIG. 14

| CHARACTERS | | | | | | | | | | | | | | | | | |
|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | | |
| ← @ = SAWYER → | | | | | | | | | | | | | | | | 0 8 10 | |
| ← 0 THROUGH 15 FEET → | | | | | | | | | | | | | | | | 1 | L E V E L S |
| ← 0 THROUGH 15 INCHES → | | | | | | | | | | | | | | | | 2 | |
| ← 0 THROUGH 7/8 INCHES → | | | | | | | | ← OPEN → | | | | | | | | 3 | |
| OPEN | 2x2 | 2x3 | 2x4 | 2x6 | 2x8 | 2x10 | 2x12 | 4x4 | 4x6 | 4x8 | 4x10 | 4x12 | 1x3 | 1x4 | SPEC'L SIZE | 4 | |
| ←OPEN→ | MRK | PLATE W/O CUT | JACK | CORN'R | SHORT STUD | CRIPPLE | BOTT PLATE NOTCH | HEADER | HED | SILL | VERY TOP PLATE | PLATE | TEE | SPEC'L NAME | | 5 | |
| ← 0 THROUGH 9 PIECES → | | | | | | | | ← OPEN → | | | | | | | | 6 | |
| OPEN | DBL | TRL | QRL | RED | GREEN | BLUE | BLACK | ← OPEN → | | | | | | | | 7 | |
| | | | | ← PAINTS → | | | | | | | | | | | | | |
| ← (0 THROUGH 9) x 10' PANEL NO. → | | | | | | | | ← OPEN → | | | | | | | | 8 | |
| ← (0 THROUGH 9) x 10° PANEL NO. → | | | | | | | | ← OPEN → | | | | | | | | 9 | |

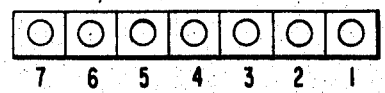

FIG. 15

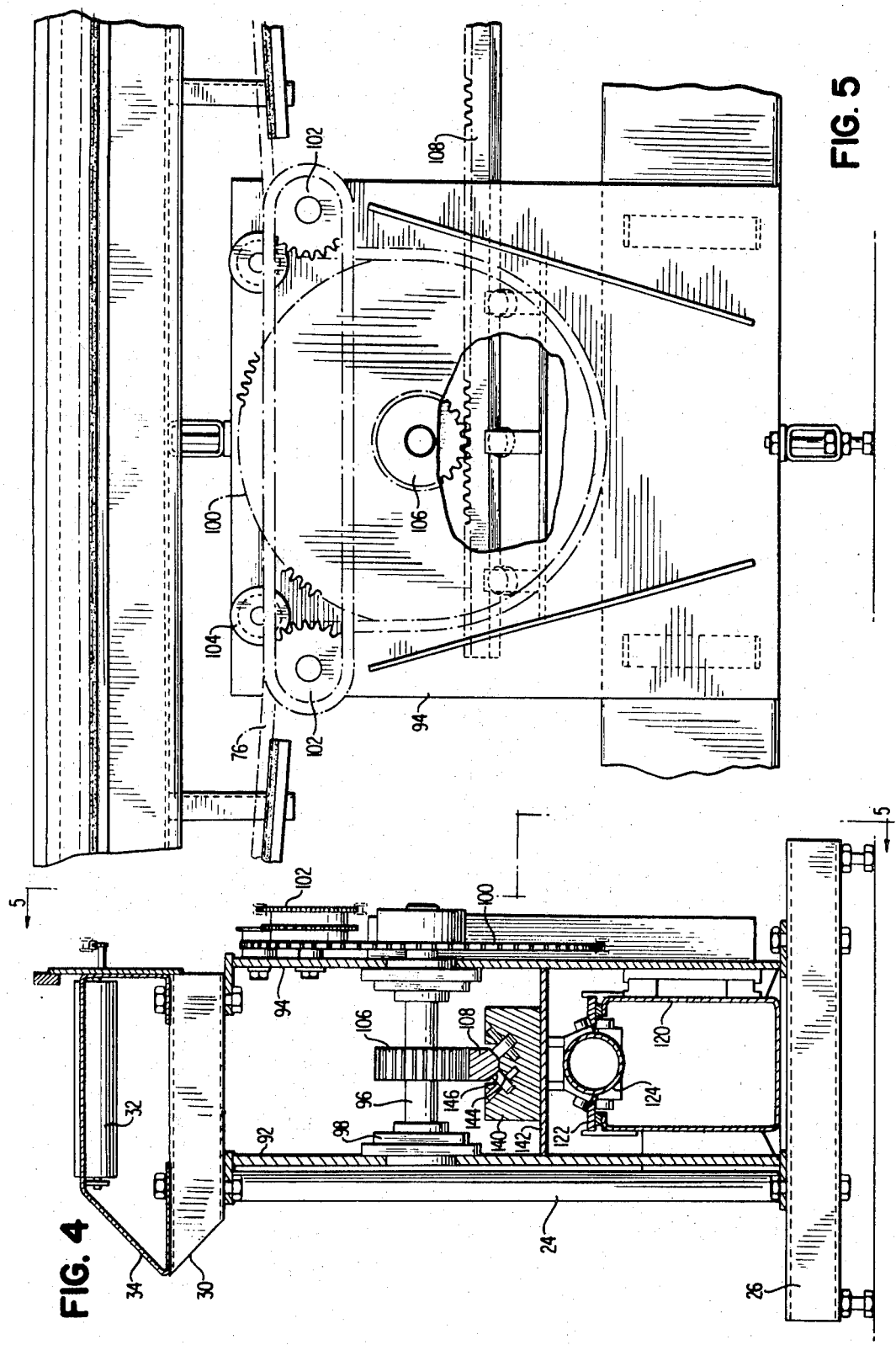

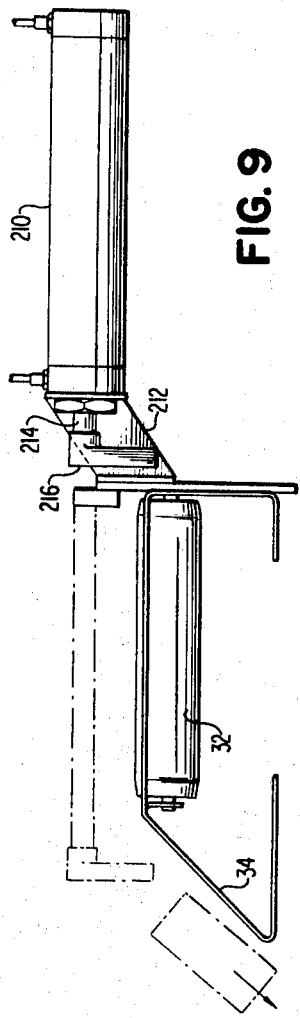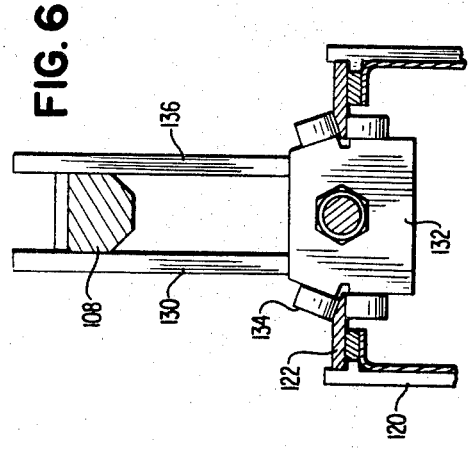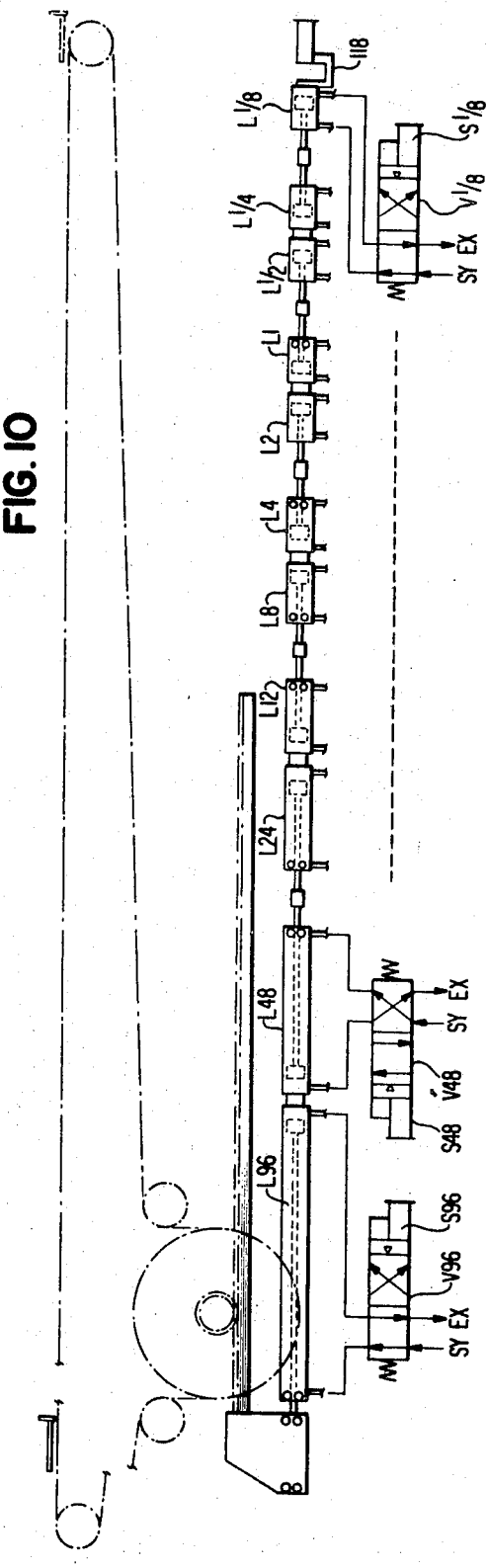

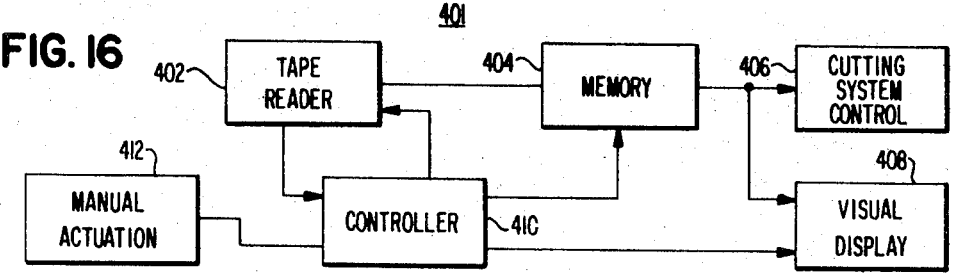
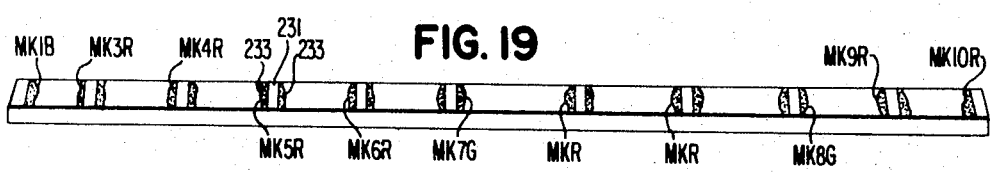
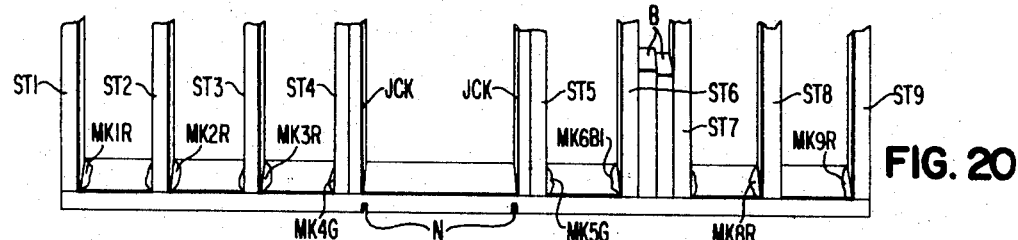
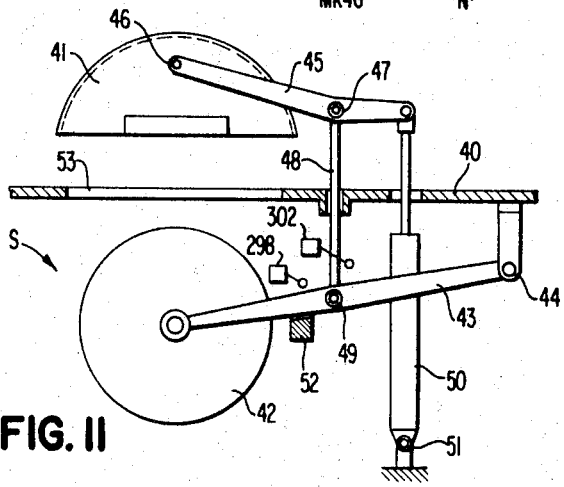
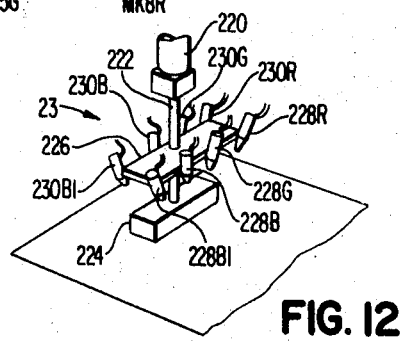
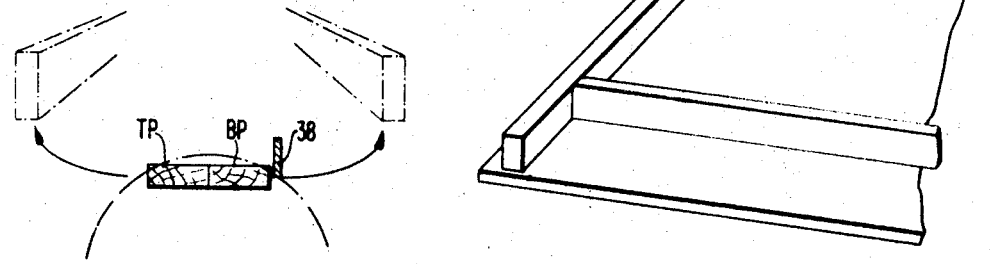

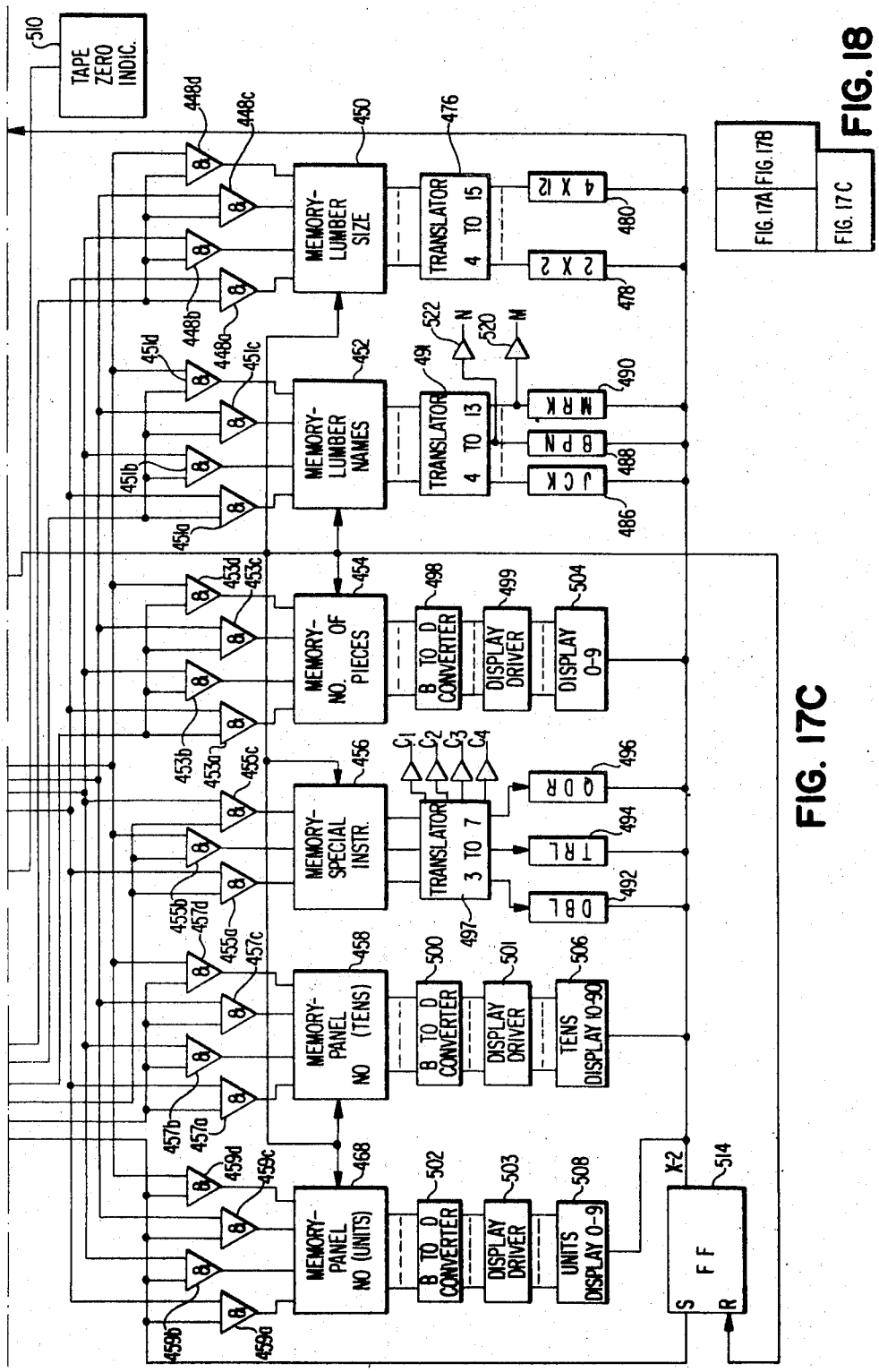

FIG. 24

APPARATUS FOR FABRICATING WOODEN BUILDING FRAMES

This application is a division of application, Ser. No. 25,536, filed Apr. 3, 1970, now U.S. Pat. No. 3,685,129.

The present invention relates to apparatus for fabricating wall frames useful in the construction of houses, buildings and the like and particularly relates, in one aspect, to apparatus for cutting lumber to predetermined lengths to form the non-standard parts of a wall frame in response to a control system including machine readable numerical information.

In another aspect, the present invention particularly relates to apparatus for marking the top and bottom plates of a wall frame prior to assembly to indicate the locations along such plates of the interconnecting parts of the frame extending between such plates and also to indicate the character or nature of the interconnecting parts, that is, whether such parts comprise studs, portions of a window or door frame or tee or corner constructions.

Heretofore in the construction of buildings, houses and the like, extensive use of manual labor and manual fabrication techniques has been required in the construction of both exterior wall panels and interior partition walls, both of which are hereinafter referred to generally as wall frames unless otherwise specified. This has resulted, not only in increased costs, but also in the fabrication of below standard frames whether due to improperly cut frame parts and/or haphazardly assembled parts. Conventional practice has been to transport raw lumber to the construction site with the carpenters at the site, cutting and assembling the various parts to form wall frames for the building, house, or the like. Obviously, the quality of the construction, the strength of the assembled frames, etc., is to a significant degree determined by the willingness and skill of the carpenters at hand to fabricate the frame and panel to the desired specification.

With the current increasing emphasis on prefabricated building structures, the parts forming the wall frames are sometimes cut and assembled at prefabrication sites and then transported to the construction site for installation as subcomponents of a building structure. Even here, however, the methods of manually nailing and cutting often lead to errors in the formation of the wall frames, for example, in the formation of non-uniform frames. It must be realized that, in the construction of a conventional home for example, there are usually over 30 different types of wall frames which may be used. Thus, the savings in time, expense and labor by fabricating wall frames at prefabrication sites rather than at actual construction sites is often offset due to the confusion and complexity attendant with the prefabrication of a large number of a wide variety of different types of frames. It is therefore desirable, particularly with the current demand for large quantities of relatively low cost housing, to prepare the various parts of wall frames for a particular house as well as the frames themselves in a systemized or production line fashion. It has now been found possible by employing the present invention to efficiently, effectively and semi-automatically fabricate the wall panels and partitions for a complete single building, house or the like in succession such that, when all of the frames are fabricated, they can be transported directly to the construction site and there assembled. Moreover, and equally as important, the systemized approach according to the present invention permits the construction of various types of wall frames for architecturally different types of houses without change in the procedure or hardward employed in the fabricating process, but rather with only a change in the software provided the numerical control system hereof.

Briefly, wall frames are generally classified as either exterior panels or interior partitions. Exterior panels are usually formed by utilizing top and bottom plates with studs connected therebetween. In most instances, a very top plate is secured in coextensive relation with the top plate to reinforce the exterior panel as it is normally a load bearing or structural frame. Interior partitions usually comprise top and bottom plates with studs connected therebetween. The exterior and interior frames are normally identical in height and thus the standard studs connecting between the top and bottom plates of exterior panels are slightly shorter than the standard studs connecting between the top and bottom plates of interior partitions due to the addition of the very top plate in the exterior panel. Various other and non-standard parts are provided in wall frames and normally comprise cripples, headers, heads, sills, short studs and the like for forming windows and door frames, tees and corners.

Upon specification by the architect of the general design of the house, building or the like, information representing the lumber length and lumber size, for example, $2 \times 4$, $2 \times 6$, or $2 \times 8$, the number of specified parts to be cut; the particular use in the frame or nature of the parts so specified, for example, their use as short studs, cripples, headers, sills, or the like, or other specified functions, can be generated on punch tape, punch cards or the like in response to the specification of the gross characteristics of the custom or standard floor plan under consideration. Moreover, this information, necessary to the fabrication of the component parts of a specified wall frame, may be provided serially on the tape or a deck of cards whereby the operator need only insert the same into a tape or card reader and is automatically provided with all of the information necessary to rapidly fabricate the individual wall frame parts. Such information is also provided in the order of assembly of the parts for facilitating the assembly of the wall frame.

A feature of the present invention includes the automatic translation of the length information into measured movement of a stop along a saw table whereby the stop can be located predetermined distances from a saw blade thereby determining the length of the part to be cut. As the length of the part to be cut is also simultaneously displayed to the sawyer, he is able to select the proper length of an uncut board and dispose the board on the table with a board end against the stop. The sawyer can then actuate the saw to make the cut. It will be appreciated that all of the non-standard parts of the frames, that is, the top, bottom and very top plates, jacks, short studs, cripples, headers, heads, and sills or any other non-standard part of a wall frame can be cut by the numerically controlled automated saw. It is of course, possible to also cut the standard parts of the frame, i.e. the long and short studs, by the numerically controlled saw by providing such information on the tape, deck of cards or the like. However, it has been found, in most instances, that considerable economy of time and labor is effected by cutting only the non-standard parts with the saw hereof as the standard parts can be purchased in their proper lengths. By serially disposing the information, on the tape, punch cards or the like, the foregoing described non-standard parts can be cut in the sequence in which they will be assembled thereby reducing the overall complexity and difficulty attendant with the assembly of the parts of the frame.

It is also a particular feature of the present invention to provide information on the tape, deck of cards or the like representing the location of the frame parts, which extend between the top and bottom plates as a function of their distance from like ends of the top and bottom plates. That is to say, the numerical information indicates the location of the frame parts intermediate the top and bottom plates as a function of the distance of such intermediate parts from like ends of the top and bottom plates. It is another feature hereof that such information is translated into movement of the lumber stop whereby the latter is located successive predetermined distances from a marking device. The top and bottom plates are then successively located against the stop and marked to indicate the location of such intermediate parts. Marking the plates facilitates both automatic and manual assembly of the parts as other measuring devices such as common rules or layouts need not be employed in assembling the parts to form the frame. Inasmuch as the parts are assembled in the sequence which they are cut, the parts can be readily located in their proper relative position through the use of such marks.

The marks are also coded to indicate the various functions of the elements forming the frame, that is, the supporting studs, window or door frame portions, tees, or corners. In this manner, the assembler of the frame not only knows the location of the intermediate parts of the frame along the plates but also can identify the type of intermediate part that should be disposed in each such location.

To reduce handling, the sequence of operations is such that the marking of the top and bottom plates is accomplished utilizing the same measuring device employed for making the predetermined length of cut, the marking being effected prior to the cutting. After the marking has been effected and the lumber cut, the finished part is automatically unloaded from the marking and sawing table onto a conveyor for transport to an assembling station which can either be a semi-automated station employing automatic nailing heads and other devices or a table layout whereon the parts are assembled and manually nailed to form the frame.

By employing the present fabricating system, the non-standard parts for each frame are fabricated in the order in which the frame is to be formed. Moreover, non-standard frames can be rapidly and efficiently fabricated in succession without confusion of their parts and without dependence upon externalities such as different plans and layouts for each of the various types of frames.

Accordingly, it is a primary object of the present invention to provide improved apparatus for fabricating wooden wall frames.

It is another object of the present invention to provide improved apparatus for fabricating wooden wall frames wherein the frame parts may be rapidly and accurately cut to predetermined lengths in response to a numerical control information.

It is another object of the present invention to provide improved apparatus for fabricating wall frames wherein the longitudinally extending parts are marked to indicate the location of adjoining vertically extending intermediate parts whereby assembly of the frame is facilitated.

It is another object of the present invention to provide apparatus for fabricating wooden wall frames wherein marks are applied along the top and bottom plates of the frame to indicate the location of adjoining frame parts and the nature of such parts.

It is a further object of the present invention to provide improved apparatus for fabricating wooden wall frames wherein the frame parts are cut to predetermined lengths in the order in which the parts are assembled to form the frame.

It is a related object of the present invention to provide improved apparatus for fabricating wooden wall frames wherein machine readable numerical information is provided representing the length of the frame parts to be cut, the size of the lumber to be utilized, the number of the specified parts to be cut, and the particular use or nature of the parts so specified and wherein such information is translated as applicable into visually displayed operating instructions for the sawyer and into instructions for a measuring device controlling a movable stop determinative of the lumber position for both marking and cutting operations.

These and further objects and advantages of the present invention will become more apparent upon reference to the following specification, appended claims and drawings wherein:

FIGS. 1A and 1B are side elevation views of respective exterior and interior frames which may be fabricated in accordance with the automated panel fabricating system of the present invention;

FIG. 1C is a horizontal cross sectional view of a corner in a frame utilized to join a pair of right angularly related frames;

FIG. 1D is a horizontal cross sectional view of a tee connection between a pair of frames;

FIG. 1E is a schematic layout of an automated frame fabricating system;

FIG. 2 is a side elevational view of an automated measuring, marking and sawing assembly constructed in accordance with the present invention and forming a part of the fabricating system hereof;

FIG. 3 is a top plan view thereof;

FIG. 4 is an enlarged cross-sectional view thereof taken about on line 4—4 in FIG. 2;

FIG. 5 is an enlarged fragmentary view thereof taken about on line 5—5 in FIG. 4;

FIG. 6 is an enlarged cross sectional view of a portion of the measuring device and taken about on line 6—6 in FIG. 2;

FIG. 9 is an enlarged fragmentary end elevational view of the fixed unloading assembly;

FIG. 10 is a schematic side elevational view of a measuring device forming a portion of the automated saw and measuring assembly hereof;

FIG. 11 is an enlarged cross sectional view of the saw blade, clamp and actuating assembly therefor;

FIG. 12 is a perspective view of a marking device employed with the fabricating system hereof;

FIG. 14 is a tabulation of the information comprising a complete numerical instruction and its format as embodied in an information carrier such as a punched tape;

FIG. 15 is a representation of one level of a punched tape showing the manner in which the numerical information in FIG. 14 is encoded;

FIG. 16 is a block diagram showing the conceptual features of a numerical control system utilizing the information tabulated in FIG. 14 to control the measuring, cutting and marking operations of the present invention;

Figure 17A:
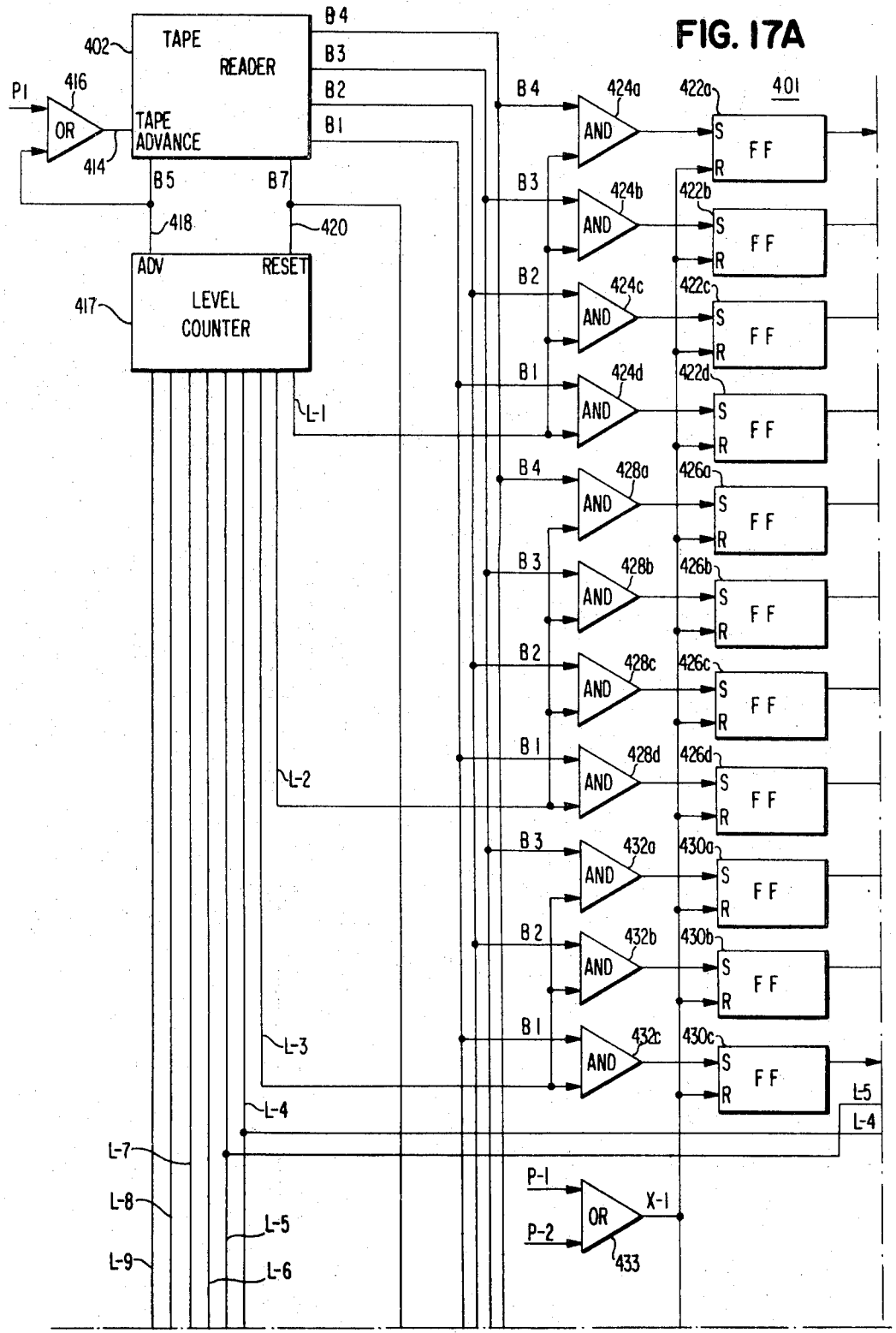
Figure 17B:
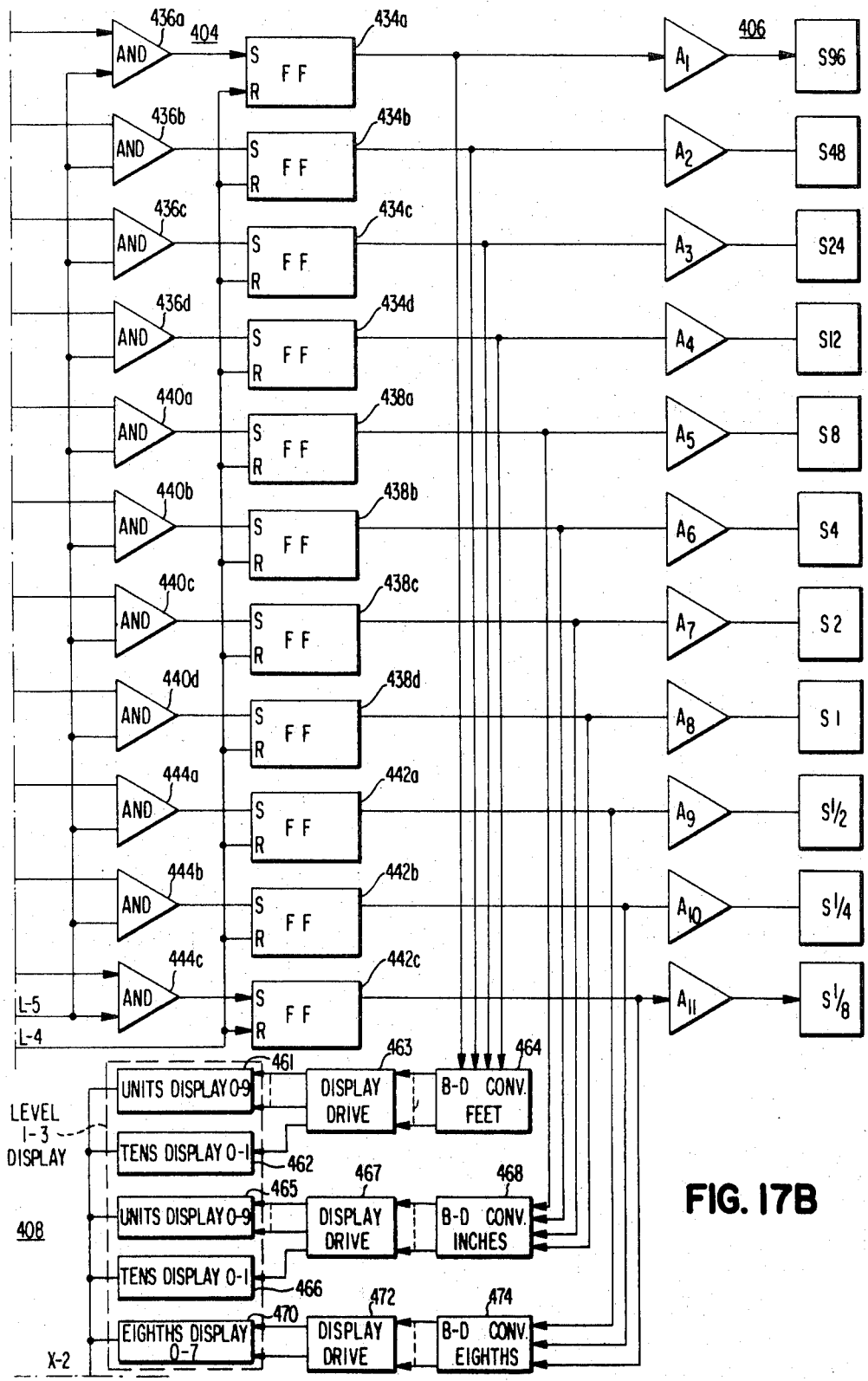
Figure 23:
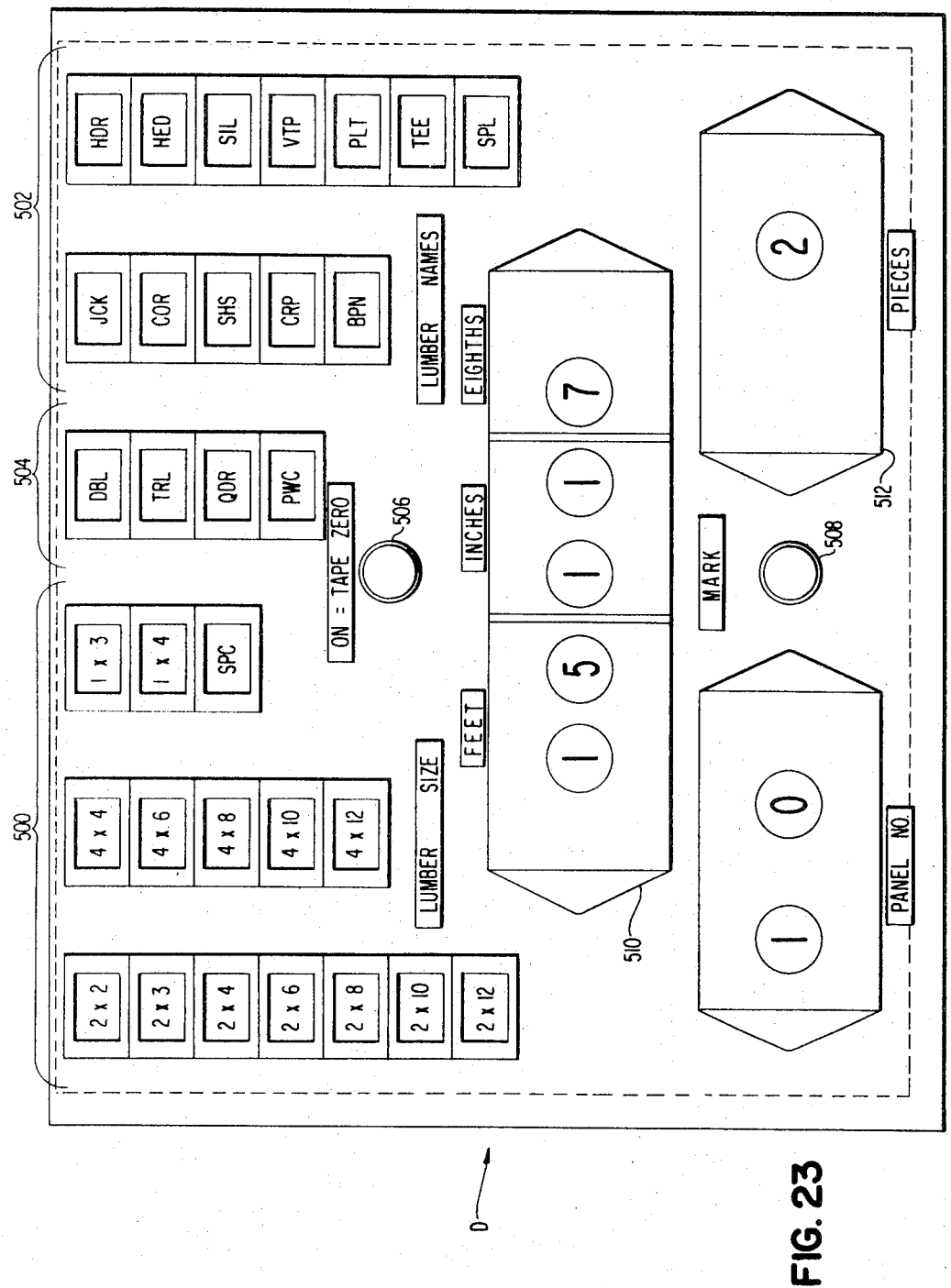

FIGS. 17A-C, assembled in the manner indicated by FIG. 18, illustrates a detailed functional block diagram of the apparatus of FIG. 16;

FIG. 19 is a perspective view of a plate illustrating the various marks indicative of the locations of other parts of the frame;

FIG. 20 is a fragmentary perspective view of a bottom plate with the various other parts of the frame secured thereto at the marked positions;

FIG. 21 is a schematic perspective view of the top and bottom plates illustrating their disposition during and after cutting;

FIG. 22 is a fragmentary perspective view of an assembly table on which the parts of the frame can be assembled;

FIG. 23 is an elevational view of the sawyer's information display console; and

Figure 24:
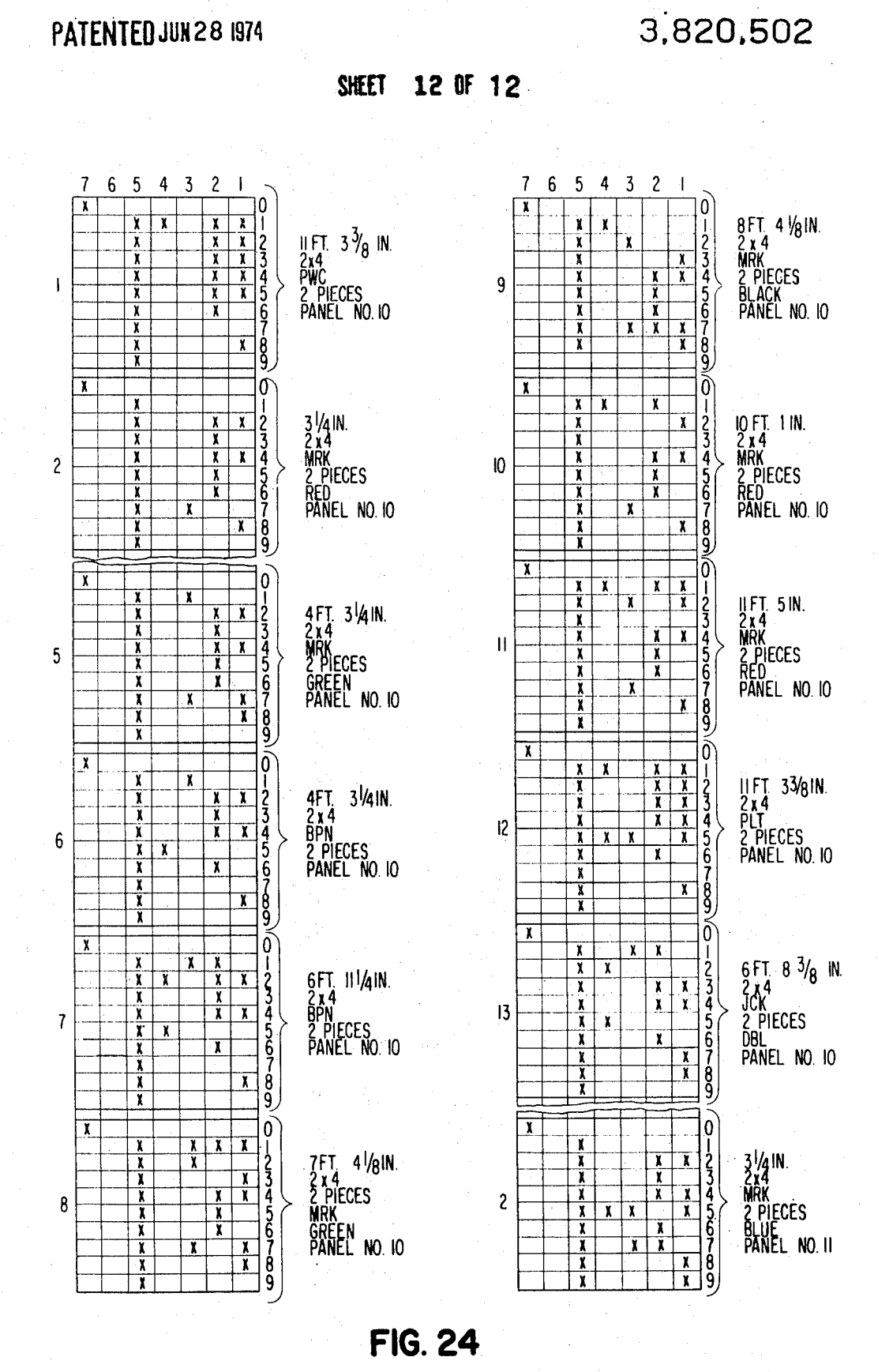

FIG. 24 is a representation of instructions serially arranged on a tape format for fabricating the interior partition of FIG. 1B and a portion of the panel of FIG. 1A.

DESCRIPTION OF EXTERIOR AND INTERIOR WALL FRAME CONSTRUCTION

Referring now to the drawings, particularly to FIGS. 1A and 1B, typical exterior and interior frames are illustrated and which may be constructed in accordance with the fabricating system illustrated in FIG. 1C. In FIG. 1A, a wall frame construction, particularly suitable for an exterior wall panel, is illustrated and comprises a top plate TP, a very top plate VTP, a bottom plate BP, a plurality of studs ST secured between the top and bottom plates, and a window frame W defined by frame members including a head HED, a sill SIL, jacks JCK, cripples CRP, a header HDR, and short studs SHS. Either the exterior or interior frames may include a corner and/or tee construction, COR and TEE respectively, described more particularly hereinafter and including blocks B illustrated in FIG. 1A. Referring to FIG. 1B, a typical interior wall partition comprises a top plate TP, bottom plate BP, a plurality of studs ST, connected between the top and bottom plates. Either the exterior or interior frame may include a door frame D which is illustrated in the interior partition of FIG. 1B and comprises jacks JCK, a head HD, a header HDR, and cripples CRP. Of course, it will be appreciated that a particular frame may include one or more of both windows and doors. It will be further appreciated that for each interior and exterior frame, there are a large number of parts, namely the studs ST which are standard in length and which comprise the majority of the structural members of each frame. For example, in forming exterior panels, the areas between the windows and doors are usually formed by connecting the top and bottom plates TP and BP respectively by a plurality of studs ST having a standard length. Similarly, in interior wall partitions the top and bottom plates are connected by a plurality of standard length studs. The studs for the interior partitions may be slightly longer, i.e. conventionally 1⅝ inches, than the studs provided for the exterior panels due to the addition in the latter, as is conventional, of a very top plate VTP for structural support.

Referring now to FIG. 1C, there is illustrated a pair of wall frames FR1 and FR2 joined one to the other at a corner. The frame FR2 is provided with a corner construction COR which, as illustrated in FIG. 1A and 1C, includes a pair of studs ST spaced one from the other by a plurality of vertically spaced blocks. The corner construction is provided at the end of frame FR2 and the other frame FR1 can be joined at right angles with frame FR2 simply by nailing through its end stud ST into the end stud ST of the corner COR. By virtue of the compound piece comprising the corner COR, the inner stud ST of frame FR2 extends beyond the frame FR1 to provide with the end stud ST on frame FR1 corner nailing surfaces for sheathing paneling and the like.

Referring now to FIG. 1D, there is illustrated a pair of frames FR3 and FR4 with the end of frame FR4 being joined intermediate the ends of frame FR3 by a Tee construction indicated at Tee, the Tee construction comprises a compound piece formed of a pair of laterally spaced studs ST with paired vertically spaced blocks B disposed between the studs ST. By employing a compound piece of this type intermediate the ends of frame FR3, there is provided when the joint is formed, an exposed stud of frame FR4 which, in conjunction with the end stud ST on frame FR4, form corner nailing surfaces on the inside face of frame FR3 and the opposite faces of frame FR4. Accordingly, both the corner and T compound pieces facilitate the joining of paneling sheathing and the like to the wall frames by providing exposed studs to which the panels can be fastened at their respective corners.

Returning now to FIG. 1B, the bottom plate BP of the interior partition is provided with a notch cut N on opposite sides of the door frame D. The bottom BP is normally notched by cutting about half-way through from its lower face whereby the integrity of the bottom plate is maintained by the unnotched portion of the upper face of the bottom plate BP. The notching is provided on opposite sides of a door frame in both interior partitions and exterior wall panels where a door frame occurs to facilitate the cutting of the bottom plate BP portion between the jacks defining the opposite sides of the door frame when the frame is finally secured in place at the actual construction site. In this manner, a carpenter at the construction site can readily, easily and rapidly saw through the remaining unnotched portions of the bottom plate directly over the notched portions thereof in order to remove the bottom plate portion between the jacks. This greatly facilitates the removal of this portion by permitting use of automated saws such as a circular hand saw at the construction site.

Turning now to FIG. 1E, the automated measuring and sawing marking assembly constructed in accordance with the present invention and hereinafter referred to as the panel fabricating apparatus is intended for use in a frame fabricating system which provides for the continuous formation of wall panels. Briefly, the fabricating system includes a parts fabricating apparatus generally indicated 10 at a fabricating station 12, at which the non-standard parts for example, the headers, cripples, jacks, heads and short studs, forming the wall frames and ultimately the finished wall panels, are cut to predetermined lengths under the control of a numerical control system to be described. Generally, speaking, the parts fabricating apparatus incudes a saw S which cuts the non-standard parts of the frame to proper length, by means to be described, from lumber indicated at L stacked close at hand. In accordance with the present invention, an operator at station 12 is provided various information by means of a visual display D including the type and length of lumber to be cut, the number of pieces to be cut and the function or nature of each cut piece in the frame to be formed. There is also provided at station 12 a unit nailer UN for nailing compound frame parts, i.e., those frame parts formed of two or more face to face butting standard or non-standard parts. For example, the unit nailer is employed to nail a short stud to an associated jack, this compound piece forming a portion of the window assembly W in the exterior panel illustrated in FIG. 1A, or to form the Tee and corner pieces previously described. The fabricating apparatus also marks the top and bottom plates to indicate the locations of the vertical or intermediate frame parts along the plates and also to indicate the locations of doors, windows, Tees and corners along the plates, all for purposes and in a manner to be described hereinafter.

The non-standard cut pieces including the marked plates and the compound pieces are then disposed on a conveyor CV in the order of their assembly by an operator at an assembling and nailing station generally indicated at 14. Generally, the pre-cut non-standard pieces are assembled with standard pieces, for example studs ST, conveyed to station 14 by a conveyor indicated CV1. A nailing machine is provided at the assembling and nailing station 14 and the operator feeds the various parts in the order in which the frame is to be assembled through a nailing machine 16 whereat the parts are finally assembled to form the frame. A continuing frame fabrication process is accomplished at nailing machine 16. That is to say, the operator at station 14 feeds the first stud between the top and bottom plates and, by actuating the nailing machine, nails the plates to the stud. The partially fabricated frame is then stepped beyond nailing machine 16 and an additional stud or non-standard part depending on the type of frame being fabricated is disposed by the operator at station 14 into nailing position. The nailing machine is again actuated and the partially completed frame is again advanced. This operational sequence is repeated until the full frame is formed. Obviously, the non-standard pieces are fed to the operator at the assembling and nailing station 14 in sequence of the order in which such members are to be nailed to form the completed frame.

The open and completed frame may then be removed from conveyor CV2 and transported to the actual construction site for use in forming the particular building, house or the like for which the frame is fabricated. Alternatively, the exterior frames can be removed from conveyor CV2 by a conveyor CV3 for disposition on a sheathing conveyor illustrated at CV4. Behind sheathing conveyor CV4, there is provided a sheathing saw or shear SS1 for cutting the sheathing to the size of the exterior frame. The sheathing is then disposed on the frame and the combined sheathing and frame can be conveyed through a sheathing nailer, indicated SN, to provide a substantially finished exterior panel. Returning now to the open frames on conveyor CV2, interior or wallboard sheathing can likewise be applied to the interior panels. The interior wall board or sheathing can be cut by a sheathing saw or shear SS2 to the side of conveyor CV2. The cut sheathing can then be disposed on the interior frame (on one or both sides as desired). The combined sheathing and frame is then conveyed through a sheathing nailer indicated SN1. It will be appreciated that the automated panel fabricating system hereof can thus provide semi-finished interior and exterior wall panels for delivery to the construction site whereat the panels can be finally assembled one to the other to form a building or the like.

MECHANICAL DESCRIPTION

Measuring, Cutting and Marking Framework

Turning now to FIGS. 2 and 3, there is illustrated an automated sawing, measuring and marking apparatus or parts fabricating apparatus constructed in accordance with the present invention and comprising, as its major sub-assemblies, a conveyor table generally indicated at 15, a traveling lumber stop and unloading assembly generally indicated 17, a chain drive therefor including a stroke multiplier generally indicated 19, a lumber clamping and sawing assembly 21 including a saw S, a fixed lumber unloading assembly generally indicated 20, a measuring device indicated 22, and a marking device generally indicated 23. Particularly, conveyor table 15 includes a conveyor support assembly having a plurality of longitudinally and transversely spaced upright stanchions 24 secured at their lower ends to cross supports 26, and a plurality of diagonal supports 28. The conveyor table includes a box-like frame 30 secured to the upper end of stanchions 24, and carrying a plurality of longitudinally spaced rollers 32. Frame 30 also includes an inclined ramp 34 on the side of the table opposite fence or rail 38 for the purpsoe of discharging lumber from rollers 30, for example, onto conveyor CV illustrated in FIG. 1 after the lumber has been cut. Fence 38 is located above and along the rear side of the conveyor table for the purpose of providing an abutment against which the lumber can be butted during the marking and sawing operations to be described. Fence 38 is coextensive in length with conveyor table 15 and is supported by a plurality of brackets 39 suitably secured to box frame 30.

Lumber Clamp and Saw Assembly

Disposed at one end of the table is the lumber clamping and sawing assembly 21 including a saw housing 40 and a saw guard 41 disposed above table 15. The saw S comprises a circular saw blade 42 located within housing 40 and movable upwardly from a position recessed within housing 40 to cut through lumber disposed on conveyor table 15 below saw guard 41. That is to say, saw S is movable upwradly to cut through the lumber disposed on table 15 after the lumber has been located on the table in a predetermined position to provide the desired length of cut. After the cut, the saw blade 42 retracts into housing 40 to permit discharge of the lumber from table 15. A fluid actuated mechanical linkage is provided for raising and lowering the saw as well as to clamp the lumber to the table for effecting the cut. To this end and referring particularly to FIG. 11, the saw S including its associated electric motor is carried on an arm 43 pivoted to housing 40 as at 44. An arm 45 is pivotally connected at one end to saw guard 41 as at 46 and is also pivotally connected intermediate its ends at 47 to the upper end of a rigid bar 48. The lower end of bar 48 is pivotally connected to link 43 intermediate its ends as at 49. A fluid actuated preferrably pneumatic cylinder 50 is pivotally secured to housing 40 at 51 and its piston rod is connected to arm 45. A stop 52 is also fixed in housing 40. It will be appreciated that extension of the piston rod will first pivot saw guard 41 downwardly about axis 47 to clamp the lumber to housing 40 with stop 52 preventing downward pivotal action of link 43. Further extension of the piston rod will cause the saw blade 42 to pivot about axis 44 upwardly through the slot 53 in housing 40 to cut the lumber. Particularly, arm 45 pivots about axis 46 and pulls rod 48 upwardly to pivot link 43 about axis 44, the guard 41 clamping against the lumber to provide a reaction force permitting arm 45 to pivot. Retraction of the piston causes the saw S to retract into the housing 40 and saw guard 41 to return to its normal elevated non-clamping position.

Travelling Stop Assembly

Figure 7:
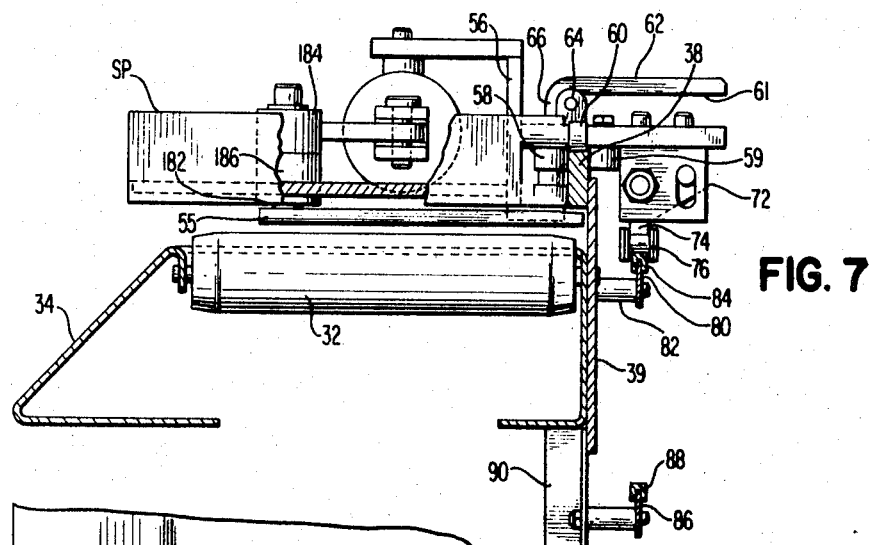
FIG. 7 is an enlarged fragmentary cross sectional view of the traveling stop and unloading assembly with portions broken out for ease of illustration.
Figure 8:
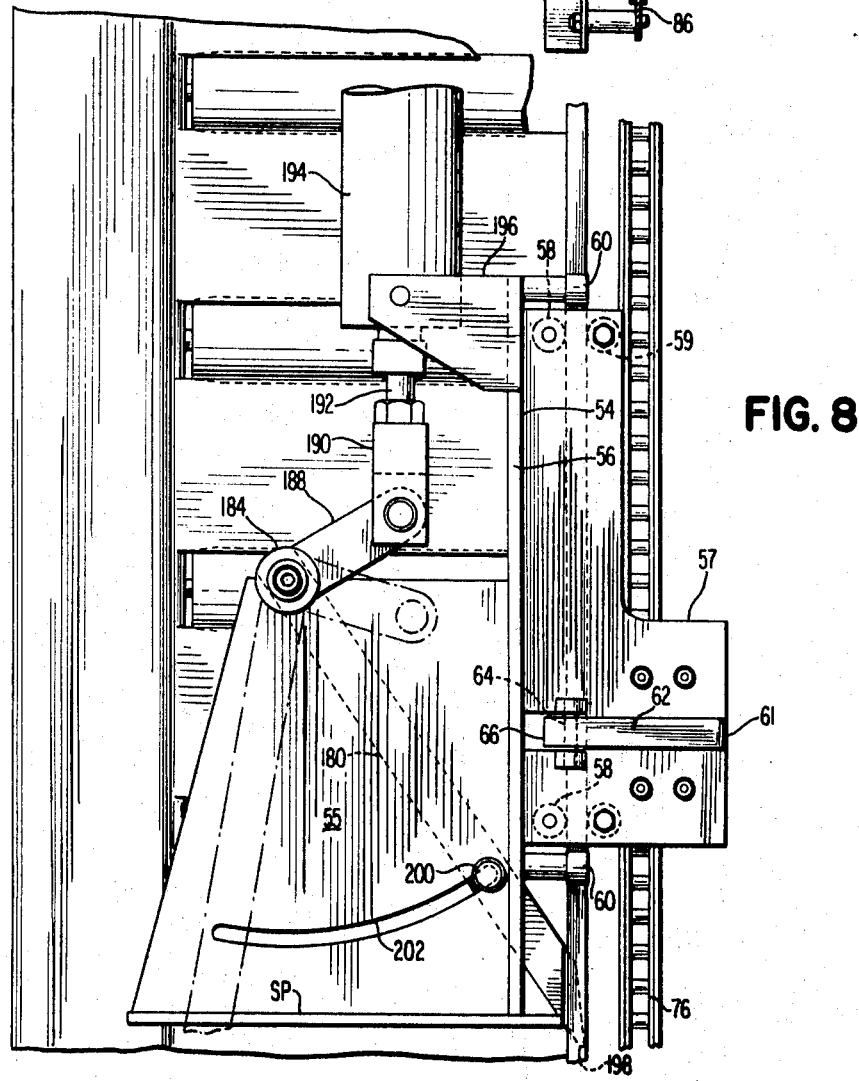
FIG. 8 is an enlarged fragmentary top plan view thereof.

Referring now particularly to FIGS. 7 and 8, the travelling stop and unloading assembly 17 is mounted for movement lengthwise along conveyor table 15 and, in general, functions to a) provide an end stop against which the lumber may be positioned at a selected distance along conveyor table 15 from saw blade 42 and marking device 23 whereby, respectively the saw blade 42 can cut the lumber to the desired length and the marking device 23 can mark th plates at selected positions therealong, and b) to provide a mechanism for automatically ejecting or discharging the butted end of the lumber from the conveyor table after the lumber has been cut by saw S. To accomplish this, the travelling stop and unloading assembly comprises: a carriage 54 including a flat base plate 55 overlying rollers 32 in spaced relation thereto, an upstanding support bracket 56 suitably secured as by welding along the inner edge of base plate 55 and a horizontally disposed support plate 57 secured along the face of bracket 56 to project outwardly therefrom over the opposite side of table 15 and above fence or rail 38. On the forward end of carriage 54, there is secured to base plate 55 an upright stop SP extending transversely across the table for its full width and against which lumber ends can be butted for purposes and in the manner to be described. Carriage 54 is mounted for sliding movement along fence 38 by means of a plurality of rollers which straddle fence 38 and a pair of cam followers. Particularly, there is provided at each of the opposite ends of support plate 57 a pair of depending rollers 58 for engagement along the inner face of fence 38 and a depending roller 59 for engagement along the outer face of fence 38. A cam follower 60 is located at opposite ends of carriage 54 and secured to upright bracket 56 to overlie the upper edge of rail 38. A travelling latch 61 is also provided and comprises a bracket 62 pivoted at 64 and includes a portion 66 which extends between upright bracket 56 and fence 38 terminating at its lower end in a laterally directed tip, not shown, underlying the lower edge of fence 38. A spring, not shown, engages between upright 56 and portion 66 of latch 61 to bias latch 61 into locking engagement with fence 38. The travelling stop and unloading assembly 17 is thus locked to fence 38 and is also free for movement along the full length of conveyor table 15. Depending from support plate 57, there is provided a chain drive connector bracket 72 having a depending tip 74 for securement to a chain 76 forming a portion of the chain drive for travelling stop and unloading assembly 17.

Referring now particularly to FIGS. 2 and 5, there is illustrated the chain drive and stroke multiplier 19 for the travelling assembly 17. Particularly, there is provided a pair of sprockets 78 and 80 at opposite ends of table 15 and along one side thereof below fence 38. As illustrated in FIGS. 2 and 7, there is provided along the rear side of table 15 an upper longitudinally extending flat 80 suitably secured to the fence mounting bracket 39 by means of a bolt and spacer arrangement 82. Along the upper edge of flat 80 is provided an elongated wear strip 84 on which the upper portion of chain 76 rides. A similar but inclined flat 86 mounting a similar wear strip 88 is similarly secured to table 15 by means of a plurality of depending brackets 90. As best seen in FIG. 4, a pair of transversely spaced support plates 92 and 94 are provided on opposite sides of table 15 intermediate its ends. A shaft 96 is supported on bearings 98 between plates 92 and 94, one end of which extends through plate 94 and mounts a large diameter sprocket 100. A pair of idler sprockets 102 are also rotatably mounted on support plate 94 and idler rollers 104 are disposed in close proximity to sprockets 102 to maintain chain 76 in engaged relation about sprockets 102. It will thus be appreciated that drive chain 76 extends about drive sprocket 100 and idler sprockets 102, bears along lower wear strips 88 to extend about end sprockets 78 and 80 and bears along upper wear strip 84. The chain connector 74 preferably is locked to chain 76 whereby the travelling stop and unloading and unloading assembly 17 can be driven lengthwise along conveyor table 15. Shaft 96, illustrated in FIG. 4 carries a drive gear 106 which lies in meshing engagement with a rack 108. It will be appreciated that longitudinal movement of rack 108 rotates gear 106 and hence drive sprocket 100 to move assembly 17 along the table.

To locate travelling stop and unloading assembly 17 selected distances along table 15 from marking device 23 and from saw S whereby a predetermined length of cut is provided, there is afforded a plurality of fluid actuated pistons and cylinder arrangements having various predetermined piston displacements providing for predetermined increments of length displacement of assembly 17 along table 15. The piston and cylinder arrangements are connected serially one with the other with the cylinders being arranged in connected pairs. Each pair of cylinders is connected to the adjacent cylinders by the next adjacent piston rods of such adjacent cylinders. The end cylinder is fixed to the table frame while succeeding cylinders are slidably mounted for longitudinal movement whereby the total displacement of the final piston rod at the opposite free end of the serially connected cylinders equals the sum of the displacements of the actuated cylinders. In a preferred form, the smallest cylinder has a piston displacement of one thirty-second inch, the next smallest a displacement of one-eighth inch, the next one-fourth inch, etc. as listed below with the largest cylinder having a displacement of 24 inches. Accordingly, actuation of selected cylinders provides a total length displacement of the movable assembly 17 equal to the sum of the selected cylinder displacements providing a total displacement of 48 31/32nd inches. By utilizing a four to one gear ratio between the chain driving sprocket 100 and the gear 106 driven by rack 108, a total movement of assembly 17 a distance of 16 feet three and seven-eighths inches in one-eighth inch increments can be effected. The following table provides, in columnar fashion, the actual displacement of the individual piston and cylinder as compared with the actual displacement of the travelling stop and unloading assembly, the letter L before a numeral in the succeeding description indicating a cylinder with a displacement in inches corresponding to the numeral.

| Actual Cylinder Displacement (inches) | Stop Travel Displacement (inches) |
|---|---|
| 1/32 | 1/8 |
| 1/16 | 1/4 |
| 1/8 | 1/2 |
| 1/4 | 1 |
| 1/2 | 2 |
| 1 | 4 |
| 2 | 8 |
| 3 | 12 |
| 6 | 24 |
| 12 | 48 |
| 24 | 96 |

Particularly, as illustrated in FIG. 10, the cylinder L1/8 having the smallest displacement is fixed to a mounting bracket 118 which, in turn, is fixed to an elongated tube 120 suitably fixed to the lower transverse table support 26. Tube 120 (FIG. 4) is open along its upper side and carries a pair of gibs 122 on opposite sides of the opening. Each of the paired cylinders is provided at opposite ends with a carrier 124 mounting a pair of cam followers 126 on each side thereof straddling gibs 122. It will be appreciated that rollers could be substituted for the cam followers 126 as desired. With the foregoing mounting of the string of cylinders and pistons, it will be appreciated that the cylinders subsequent to fixed cylinder L1/8 are freely slidable along tube 120. The piston rod associated with the largest cylinder L96 is connected to a push-pull bracket 130 mounted on a pair of longitudinally spaced carriers 132 also mounting pairs of cam followers 134 on opposite sides and ends to straddle gibs 122. Bracket 130 comprises a pair of upright plates 136 between which is secured one end of rack 108. Rack 108 lies in meshing engagement with a gear 106 and it will be appreciated that the movement caused by displacement of selected cylinders will be translated to rotary movement of gear 106 and hence lengthwise movement of travelling assembly 17 along table 15 through the chain drive.

Referring now specifically to FIG. 10, it will be seen that the cylinders subsequent to the initial fixed cylinder L1/8 are arranged in fixed cylinder pairs. For example, cylinders L1/4 and L1/2 are suitably rigidly secured in back to back relation one to the other with the piston rod associated with cylinder L1/4 being suitably connected to the preceding piston rod of cylinder L1/8. The piston rod of cylinder L1/2 is similarly connected to the piston rod of the next subsequent cylinder L1 which cylinder is, in turn, rigidly connected with cylinder L2 in back to back relation therewith. The piston rod of cylinder L2 is connected to the piston rod of cylinder L4 and it will be appreciated that succeeding pairs of cylinders are similarly connected with the piston rods of each cylinder being connected to either the piston rod of the nearest cylinder of the next preceding pair of cylinders or the piston rod of the nearest cylinder of the next subsequent pair of cylinders. The piston are illustrated in FIG. 10 in their fully retracted position with the travelling stop assembly 17 located at its closest position to saw S, i.e. about 3¼ inches to the left of the saw S as seen in FIG. 2. Each cylinder is actuated by a four way two position solenoid actuated valve in communication via pneumatic supply and exhaust lines 254 and 252 with a source of air under pressure, P.S. (FIG. 13) and a reservoir, not shown, respectively, each valve having a spring return. For consistent notation and to facilitate description of the operation of the apparatus hereinafter, the valves and solenoids associated with the length position cylinders are provided the identical numerical designation as the length of movement, in inches, of the travelling assembly caused by actuation of that valve and cylinder, the valves and solenoids being preceded with the letters V & S respectively.

Referring to FIGS. 2 and 4, rack 108 is supported just below gear 106 by a plurality of support brackets 140 mounted on a transversely extending support plate 142 extending between plates 92 and 94 above the cylinders. The support brackets 140 mount pairs of rollers 144 on opposite sides of the lower bevelled surfaces 146 of rack 108 whereby rack 108 is supported for translational movement and precluded from lateral movement. It will be noted that the hose connections for supplying and exhausting fluid to the cylinders L are carried within tube 120 and exit through the side of tube 120 for connection with a valve junction box JB seen in FIG. 2.

Travelling Unloading Assembly

Referring now particularly to FIGS. 7 and 8, the travelling stop assembly 17 includes an automatic unloading assembly whereby the end of the lumber on conveyor 15 adjacent stop 17 can be displaced from rollers 32 onto ramp 34 for disposition onto conveyor CV. This travelling unloading assembly includes an unloading blade 180 pivotally carried below plate 55 for swinging movement from one side of conveyor table 15 below fence 38 to the opposite side thereof for the purpose of displacing the lumber ends adjacent lumber stop SP away from fence 38 across conveyor 14 onto ramp 34. The inner end of blade 180 is mounted on a shaft 182 keyed to a crank 184 which seats on a roller 186 fixed to plate 55. One end of a crank arm 188 is secured to crank 184 while its opposite end is pivotally carried by a clevis 190. Clevis 190 is secured to the outer end of a piston 192 carried by a fluid actuated cylinder 194. A pair of cylinder brackets 196 pivotally mount the forward end of cylinder 194 to permit extension of piston rod 192 and clevis 190 to rotate crank arm 188 from the full line to the dashed line positions illustrated in FIG. 8. In rotating the crank arm from the full line to the dashed line position, it will be appreciated that tip 198 of blade 180 swings from a position below fence 38 and inwardly of the lumber end across the table forwardly of stop SP to a position adjacent the opposite side of the table, the blade engaging the lumber end adjacent the fence 38 and moving it across the table 15 for disposition onto ramp 34. A bolt 200 is received in an arcuate track 202 formed in plate 55, the lower end of bolts 200 being secured to blade 180 whereby blade 180 is maintained in position above rollers 32. Referring to FIG. 2, suitable hose connections 204 are provided cylinder 194 and extend beyond the travelling stop and unloading assembly 17 along the top of the table through an end bracket 206 and about a hose takeup reel 208 located below the end of the table.

FIXED UNLOADING ASSEMBLY

Referring now particularly to FIG. 9, there is illustrated in detail the fixed unloading assembly 20 located adjacent saw S. Unloading assembly 20 includes a fluid actuated cylinder 210 mounted on a bracket 212 secured to the upright support 39. Cylinder 210 is oriented such that its piston rod 214, which carries a pusher lead 216, is adapted to extend from a retracted position illustrated by the full lines in FIG. 9 across table 15 to a fully extended position illustrated by the dashed lines in FIG. 9. It will be appreciated that, in moving pusher head 216 from the retracted position to the extended position, the end of the lumber adjacent the saw blade is moved across table 15 for discharge onto ramp 34.

MARKING DEVICE

Referring now to FIG. 12, the lumber marking device 23 includes a fluid actuated cylinder 220 disposed over table 15 and a piston 222 carrying on its free end a clamping and marking plate 224 for engaging against the upper surface of the lumber on table 15 in a manner to block out the area on the plates against which the parts, i.e., studs, etc. connecting between the top and bottom plates in the assembled frame will butt. Spaced back from the end of piston rod 222 and plate 224, there is secured a support bracket 226 carrying on each side four spray or nozzle heads 228 and 230. The heads 228 and 230 are disposed such that a selected head on each side of bracket 226 can be directed to spray a like colored marking die on the lumber on the associated side of the marking plate 224 whereby, upon retraction of piston 222, a clearly delineated unmarked area 231 (FIG. 19), the width of the connecting part, is left between the sprayed portions of the lumber indicated at 233. Each of the like heads of each set is connected via a suitable line 232 (FIG. 13) and a connection to an associated marking dye pressure pot 234. Four different colors are provided in the pressure pots for each set of nozzle heads 228 and 230, the colors, red, green, blue and black being chosen to represent the different nature or function of the parts to be connected between the plates. For example, the color red when sprayed on opposite sides of marking block 224 onto the lumber indicates that a standard stud is to butt the plates at the unmarked area delineated by the spray coated portions of the lumber. The color green represents that a connecting part defining an opening in the frame, for example, a window or door opening, should be disposd at the unmarked area between the sprayed portions. The color blue represents the location of a part forming a corner in the frame. The color black indicates the location of a part forming a tee in the frame. Obviously, other colors or other types of marking indicia could be employed to designate the various functions of the interconnecting parts. Additional colors or indicia could also be employed to designate other functions as desired.

Fluid Control Circuit

Figure 13:
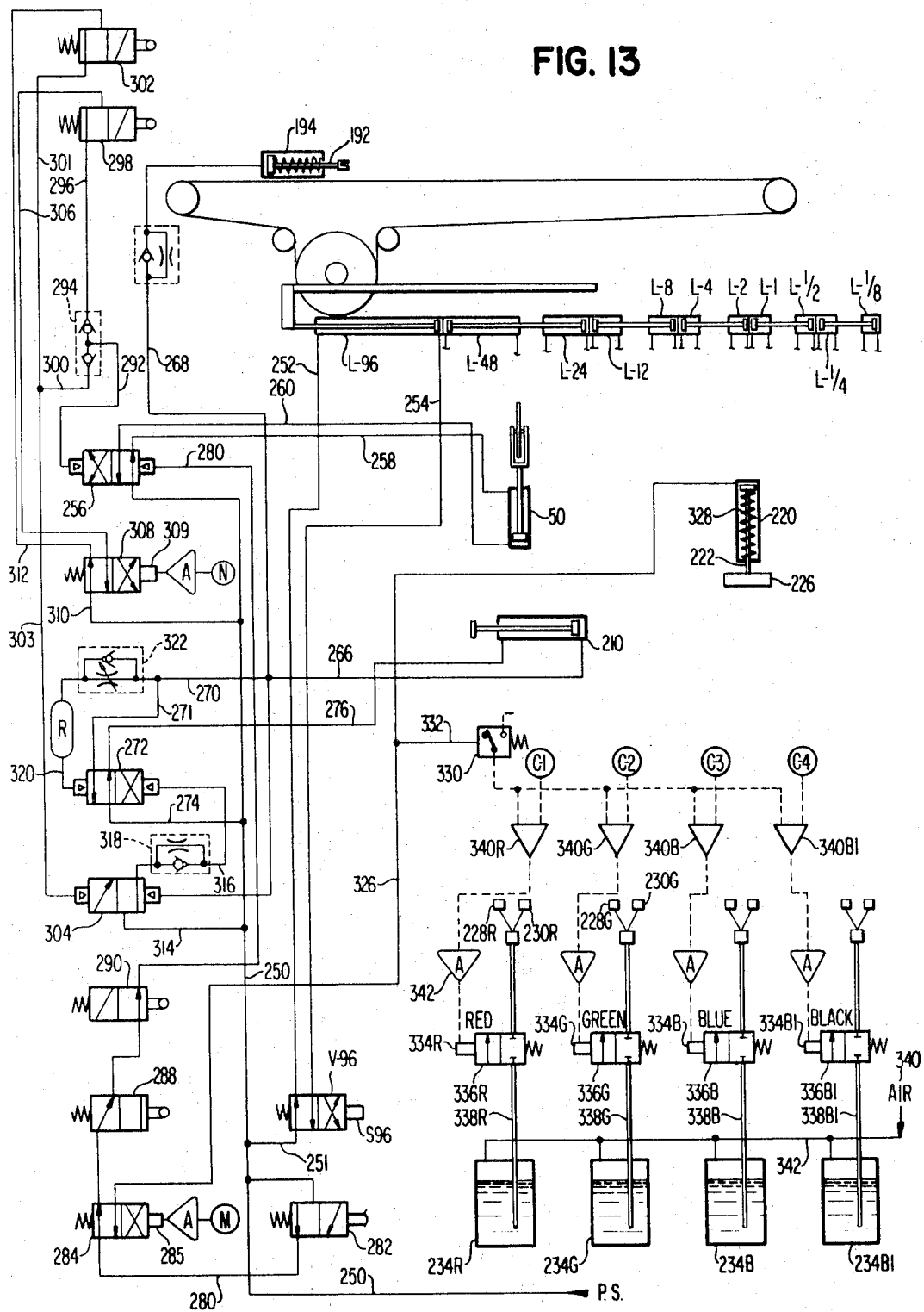
FIG. 13 is a schematic of a pneumatic control system for the sawing, measuring and marking assembly hereof.

As illustrated in FIG. 13, a fluid circuit is provided and arranged in controlling relation to the lumber stop positioner cylinders L for controlling the position of travelling stop 17 along table 15, the clamping and sawing assembly 21 including cylinder 50, the travelling and fixed lumber unloading cylinders 194 and 210 respectively, a notch cutting mechanism to be described, and the lumber marking device 23. Particularly, a source of fluid, preferably air, under pressure is provided by a source PS which, in the preferred embodiment, provides 80 psi filtered and lubricated air to a main air supply conduit 250. The stop positioner cylinders $L_1$ – $L_{96}$ are connected in parallel with main supply conduit 250 with each cylinder having conduits 252 and 254 respectively, in communication with the rod and head ends of the associated cylinder through an associated valve V, the exhaust lines from the valves back to a reservoir or supply PS not being shown. As noted previously, valves V are each two position-four way valves normally maintained in the illustrated position by the bias of an associated spring. In the normal position of the valves V, air is supplied via conduit 250 and branch conduit 252 to the rod end of the stop position cylinders L maintaining the pistons in a retracted position. Solenoids S are provided valves V and, when selectively actuated in a manner to be described, shift the associated valves to a second position wherein supply conduit 250 is disposed in communication with the head ends of the associated cylinders via conduit 254 with line 252 exhausting the rod end of the associated cylinders through the corresponding valves. As will be appreciated, air under pressure, when the system is at rest, maintains the rod end of each of the cylinders in a fully retracted position thereby locating lumber stop SP adjacent saw S.

Main supply conduit 250 also supplies air to the rod end of clamp and saw cylinder 50 via a two position-four way air actuated saw control valve 256 and a conduit 258. The head end of cylinder 50 exhausts through valve 256 via a conduit 260. Valve 256 is illustrated in a rest position wherein the saw guard and clamp 41 is maintained in an elevated position above table 15 and saw blade 42 is maintained in a retracted position within saw housing 40 as illustrated in FIG. 11.

The head ends of the fixed and travelling unloading cylinders 210 and 194 respectively are connected in parallel one with the other via conduits 266 and 268 respectively which form a part of a Y connection with branch conduit 270. Conduit 270 lies in communication with an unloading cylinder control valve 272 via a conduit 271. Valve 272 is a two position-four way air actuated valve which, in the illustrated rest position, supplies air to the rod end of fixed cylinder 210 via conduits 276, 274 and 250 to maintain pusher head 216 in a retracted position with the head end of cylinder 210 exhausting through valve 272 via conduit 266. With the piston of travelling stop unloading cylinder 194 being normally spring returned and line 268 normally exhausting through valve 272 via line 270, it will be appreciated that both unloading pistons will remain in their fully retracted position. A flow control valve 269 is provided in conduit 268 for reasons as will be appreciated by those skilled in the art.

A circuit for controlling clamp and saw cylinder 50 is provided and includes an air control line 280 for shifting valve 256 into a second position, line 280 being connected to main supply line 250 through a plurality of serially connected control valves as follows; a two position-two way start operation valve 282 which is spring biased into its illustrated normal position precluding flow from main supply conduit 250 into control line 280 and movable by a sawyer actuated operating pedal P into a second position to provide air flow in control line 280; b) a four way-two position spray interlock valve 284 normally spring biased into the position illustrated and movable into a second position by actuation of an interlock solenoid 285 under the control of an electrical signal M to be described; c) a two way-two position safety valve 288 normally spring biased to the position illustrated; and d) a two position-two way guard interlock valve 290 normally spring biased to the position illustrated. A control line 292 is provided on the opposite side of saw actuating control valve 256 in communication with a shuttle valve 294. An input line 296 is in communication with valve 294 and with a two position-one way saw return valve 298. An input control line 300 communicates with valve 294 on its opposite side and lies in communication via line 301 of a Y connection with a two position-one way saw return valve 302. The other line 303 of the Y connection communicates with one side of an air actuated two position-two way delay valve 304. A conduit 306 connects between a four way-two position notch control valve 308 and saw return valve 298. Main supply conduit 250 normally lies in communication with saw return valve 302 via a conduit 310, valve 308, and a supply line 312.

Delay valve 304 communicates with supply conduit 250 via conduit 314. A control line 316 connects between the outlet port of valve 304 through a flow control valve 318 with a pilot valve for unloading cylinder control valve 272. Conduit 271 communicates via a Y connection with a pilot control valve on the opposite side of valve 272 via a line 320 which also includes a serially connected flow control valve 322 and a reservoir R.

For actuating the marking device 23, air conduit 326 communicates between spray interlock valve 284 and the head end of spray bezel cylinder 220. A spring 328 is provided to maintain piston rod 222 in its fully retracted position with marking plate 226 spaced above the lumber on table 15. A pressure actuated switch 330 connects with conduit 326 by a conduit 332. Actuation of switch 330 in response to a predetermined pressure in conduit 326 completes a circuit with a selected one of electrical signals C1–C4 (provided in a manner to be described) in an associated AND gate to actuate the corresponding solenoid 334R, 334G, 334B or 334BL. Solenoids 334 operate associated two position-one way spray head actuating valve 336. Valves 336 are normally spring biased to preclude communication between the marking dye pressure pots 234 and the spray heads 228 and 230 via dye conduits 338. Dye pots 234 are connected in parallel with an air pressure source 340 by a conduit 342.

It will be appreciated that when the valves in the pneumatic control system lie in their illustrated rest positions and air under pressure is provided through supply conduit 250, a) the stop position cylinders L are maintained in their fully retracted position locating stop SP 3 ¼ inches to the left of saw blade S as seen in FIG. 2; b) the clamp and saw cylinder 50 is maintained in its retracted position by air supplied via conduit 250, valve 256 and conduit 258; c) the travelling stop and unloading cylinder 194 is maintained in its retracted position by its spring with the head end of the cylinder being vented through conduit 268, valve 272 and conduits 268, 270 and 271; d) fixed unloading cylinder 210 is maintained in a fully retracted position by air provided its rod end from conduits 250 and 274, through valve 272 and and conduit 276; the spray bezel cylinder 220 is maintained in a fully retracted position by its spring; and pressure switch 330 is maintained in a deactivated position as conduit 326 is vented through valve 284.

Selected energization or actuation of any one of the solenoids S shifts the associated valve V to provide pressure fluid from supply conduit 250 through the associated valve via conduits 251 and 254 into the head side of the corresponding cylinder L to extend the piston thereof. In the valved shifted position, pressure fluid exhausts from the rod side of each actuated cylinder L through its associated valve V via a conduit 252 for return to a reservoir not shown. De-energization of solenoids S permits the associated valve V to shift under the bias of its spring to again provide pressure fluid to the rod side of its cylinder L. In this fashion, any selected one or more of the stop positioner cylinders L can be actuated to locate stop SP a predetermined distance from saw blade S through the rack and pinion and chain drive.

To actuate clamp and saw cylinder 50 after the lumber has been placed on table 14, the sawyer depresses foot pedal P to manually shift start operation valve 282 to the left as seen in FIG. 13 to provide control to the pilot valve on one side of saw actuating valve 256 via control line 280 and air through valves 282, 284, 288 and 290. This control line air shifts valve 256 to the right in FIG. 13 and air is provided through valve 256 via conduits 250 and 258 to the head end of cylinder 50 to extend its piston rod. Clamp or guard 41 is thus pivoted downwardly to clamp the lumber to the table and saw blade 42 is pivoted upwardly to cut through the lumber, all in the manner previously described. After saw blade 42 has cut through the lumber, the piston rod engages saw return valve 302 shifting it to the left as seen in FIG. 13 to direct control line air to the pilot valve on the opposite side of valve 256 via supply conduits 250 and 310, valve 308, conduit 312, valve 302, lines 301, 300 and 292. Valve 256 is thus caused to shift to the left in FIG. 13 to direct the air from supply conduit 250 to the rod end of cylinder 50 via conduit 260. Simultaneously with the actuation of saw return valve 302, control air is supplied via line 303 to the pilot of delay valve 304. Valve 304 shifts to the right in FIG. 13 to provide control air through flow control valve 318 via conduits 250 and 316 to shift the lumber unloading valve 272, after a predetermined time delay, to the left in FIG. 13. When shifted, valve 272 provides air from conduit 250 to the head end of the fixed unloading cylinder 210 via conduits 274, 271, 270 and 266 and to the head end of the travelling stop unloading cylinder 194 via conduits 274, 271, 270 and 268 to extend the respective pistons thereof and thereby displace the lumber laterally of table 15 onto ramp 34.

Control air also flows through a flow control valve 322 into reservoir R and then to a pilot for valve 272 via lines 274, 271 and 320 to return valve 272 to its normal position in FIG. 13 after a predetermined time delay. The return of valve 272 provides air to the rod end of fixed unloading cylinder 210 via conduits 250, 274 and 276 and vents air from the head end of stop cylinder 194 via conduits 268, 270 and 271. The piston rod 192 of cylinder 194 retracts under the bias of an associated spring.

For making notch cuts, the stop positioner cylinders L operate as previously described to locate the stop SP a predetermined distance from the saw blade corresponding to the distance between the notch cut and the end of the board. The sawyer then shifts start valve 282 to provide air to the clamp and saw cylinder 50, the guard 41 first clamping the board to the table and the saw being subsequently elevated as previously described. Simultaneously as electrical signals are provided solenoids S for operating selected stop positioner cylinders L, solenoid 309 is actuated by an electrical signal N (provided in a manner to be described) to shift valve 308 to the left as seen in FIG. 13 to provide air from supply conduit 250 to saw return valve 298 via conduits 310 and 306. When the saw has completed cutting a notch in the underside of the board, the piston rod engages and shifts valve 298 to the left in FIG. 13 to provide control air from conduit 306 via lines 296 and 292 to a pilot for valve 256 whereby the latter is shifted back to its normal position supplying air to the rod end of cylinder 50 via conduit 258 and venting the head end of cylinder 50 via conduit 260. In this manner, the saw is raised only to the specified height for cutting the notch to its predetermined depth and is immediately retracted before a full through cut can be made. Shuttle valve 294 prevents control air in line 296 from communicating with line 300 and thus precludes flow of control air to the unloading cylinder control valve 272. Both the fixed and travelling unloading cylinders are, in effect, disable when a notch cut is provided and this prevents premature discharge of the lumber or board from the table before the board has been cut to its proper length.

To apply a mark to the top and bottom plates, the stop position cylinders L operate as previously described to locate stop SP a predetermined distance from the marking device 23 corresponding to the distance between the end of the board and the location of the part along one or both plates. Simultaneously, an electrical signal M (provided in a manner to be described) actuated solenoid 285 to shift spray interlock valve 284 to the left in FIG. 13. After butting one or both of the board ends against stop SP, the sawyer depresses pedal P and maintains it in a depressed condition to provide air to the head end of spray cylinder 220 via conduits 250, and 326. The piston rod 222 is thus extended to clamp the marking plate 224 against the top of the lumber. Note that by shifting spray interlock valve 284, the clamp and saw cylinder 50 and the unloading cylinders are, in effect, disabled. As pressure builds up in conduit 326, pressure switch 330 closes to provide an input signal to AND gates 340 which signal, when combined with the selected signal of electrical signals C1–C4, operates the selected AND gate 340 to provide an output signal to actuate the corresponding spray solenoid, all as specified by the electrical control system to be described. Actuation of the selected solenoid shifts its corresponding valve 336 to the right in FIG. 13 to provide communication between the associated marking dye pressure pot 234 and pair of spray heads 228 and 330 whereby marking dye is applied on the lumber on opposite sides of marking plate 224. After the dye is applied, the sawyer releases pedal P. Valve 282 thus shifts to exhaust conduit 326 whereby the pressure switch is first deactuated to remove the input signal from the AND gates. The previously actuated solenoid is accordingly deactuated and the valve 336 shifts back to its normal and illustrated rest position preventing communication between the previously selected dye pot and its associated spray heads.

Electrical Control System

Lumber selection and part identifying information and operating instructions for saw S, the lumber reference positioning stop SP, the markers, making notch cuts N, etc., are provided numerically. The required information is contained in a medium such as a punched tape, or a deck of punched cards or the like, and is provided to a numerical control system. This in turn actuates the sawyer's instruction display console D and actuates the fluid control system previously described to accomplish the required measuring, cutting and marking operations.

In a preferred embodiment of the system, all of the required operating functions are defined by a series of numerical instructions, each contained in nine rows on a 7-bit punched tape. The required information for a given operation, e.g. a single cut, a single part location mark, etc., is tabulated in FIG. 14. Listed vertically are the 16 decimal characters which can be provided using a 4-bit binary code. The ten horizontal rows represent the nine "words" or information levels constituting a complete instruction, and a tenth or transition level which precedes and follows each complete instruction, and during which the sawyer-initiated cutting and marking operations are accomplished.

Levels ONE through THREE on the tape provide the information required for positioning lumber stop ST. Level ONE contains 16 "foot" settings in one-foot increments between zero and fifteen feet. Level TWO provides 16 "inch" settings in the eighth-inch increments between zero and seven-eighths inch. Using an 8–4–2–1 binary code format, sixteen characters can be represented in each level. Thus, all available characters in Levels ONE and TWO are utilized, while only the first eight characters in Level THREE are needed. The remaining eight characters in Level THREE are unused. This is shown by the designation "open" in FIG. 14.

Level FOUR represents the size, i.e., the cross sectional dimension of a piece of lumber to be cut or marked. As shown, fourteen standard lumber sizes are provided for by characters ONE through FOURTEEN, with Character SIXTEEN being allocated for a special size designation. In this level, the ZERO Character is without significance, i.e., open.

Level FIVE provides identifying names of twelve standard parts used in frame construction. Characters ONE through TWELVE are used for this purpose. A 13th character provides for identification of a special frame element. The remaining three characters, i.e., ZERO, ONE and TWO are open.

Level SIX instructs the sawyer as to the number of pieces of the particular type to be cut. The ZERO is present during the notching function as hereinafter explained, but is otherwise without significance. Characters ONE-NINE provide the actual instructions; Characters TEN-SIXTEEN are unused.

Level SEVEN provides special assembly and marking instruction. Characters ONE through THREE represent the instructions DOUBLE, TRIPLE, and QUADRUPLE, respectively, which provide visual instructions to the sawyer needed for operation of the unit nailer as hereinafter described. Characters FOUR through SEVEN provide the color coding information for part location marking: RED (standard stud); GREEN (opening); BLUE (corner); and BLACK (Tee) respectively. The remaining Characters, ZERO, and EIGHT through FIFTEEN, are unused.

Finally, levels EIGHT and NINE provide information for identifying the panel number in which the lumber being cut is to be incorporated. The "tens" digit is represented by Characters ZERO through NINE in Level EIGHT, while the "unit" digit is represented by the Characters ZERO through NINE in Level NINE. In both levels, the Characters TEN through FIFTEEN are unused.

A suitable punched tape format is shown in FIG. 15. The required sixteen characters are provided by an 8-4-2-1 code using bits ONE-FOUR on the tape. Bit FIVE is used for automatic tape advance and level counting, and is present in each of Levels ONE-NINE of a complete instruction. Bit SEVEN represents the transition or ZERO Level. This bit is present only in the transition level, and in fact is the only bit present in that level. The functions of bit SEVEN are to operate the "SAWYER" indicator indicating readiness to execute a complete instruction (or to accept a new instruction), to condition the system for receiving a new complete instruction, and (by the absence of Bit FIVE in the transition level) to prevent tape advance. No function is provided for Bit SIX.

FIG. 16 is a simplified block diagram showing the generalized functions of the numerical control apparatus of the present invention.

The system generally denoted at 401 comprises a tape reader 402, a numerical instruction memory 404, an electro-mechanical control unit 406 and a visual display unit 408. A controller 410 receives manual actuation signals, generally denoted by 412, and internal system control signals from tape reader 2 to provide operating control of the remainder of the system.

A more detailed functional block diagram of numerical control system 1 is shown in FIGS. 17A-C, assembed in the manner indicated in FIG. 18.

Referring to FIG. 17A, tape reader 402 is a commercially available unit of any conventional or desired type and its construction per se does not constitute a part of this invention. From a functional standpoint, the tape reader provides six information outputs denoted B-1 through B-5, and B-7, corresponding to the bits on the punched tape represented in FIG. 15. A tape advance input 14 is driven by an OR gate 16 to actuate the tape drive mechanism in the tape reader in conventional fashion. A first input P1 to OR gate 16 is generated by manually operated tape advance treadle, not shown. A second input is provided by the B-5 output of the tape reader.

Thus, whenever the tape advance treadle is depressed by the sawyer, or whenever the particular level on the tape then being read contains the bit FIVE, a tape advance signal is provided to tape reader input 414, causing the tape to advance, and the next level of information to be read in. As will be recalled, each tape level of a complete instruction contains the Bit FIVE except the ZERO or TRANSITION Level. Thus, when a TRANSITION Level is encountered, the tape does not advance until the treadle is again depressed. For levels ONE-NINE, the tape is automatically advanced through each level, thereby assuring automatic reading of the complete instruction.

Conceptually, OR gate 416 may be regarded as part of controller 410 shown in FIG. 16. Also included in controller 410 is a level counter 417 comprising a 10-stage counter and rela related circutry. A series of outputs L-1 through L-9 are provided, each output corresponding to one of the nine levels in a complete instruction. An ADVANCE input 418 is coupled to the B-5 output of tape reader 402 to step the counter through a complete cycle in synchronism with the levels on the tape. A RESET input 420 is connected to the B-7 output of the tape reader to return the level counter to its reset state with a signal appearing at one of the outputs L-1 through L-9 during the ZERO or TRANSITION level.

The portion of the system denoted as memory 404 in FIG. 16 includes a storage element for each information bit in a complete instruction. Referring to FIG. 17B, it may be seen that levels THREE and SEVEN each require only seven characters, whereas the remaining Levels each require sixteen characters. Using the 8-4-2-1 binary code, it will be understood that three binary digits are required for levels THREE and SEVEN, while the remaining levels each require four binary digits, for a total of 34 bits. In addition, because of the particular functions to be controlled by levels ONE-THREE (operation of the stop positioner cylinders L1/8-L96) it is preferrable that read-in of levels ONE-THREE of a new instruction be completed before the previous stop setting information is erased. This requires provision of buffer capacity for the levels ONE-THREE memory stages, with a second storage element for each bit in these three levels. Thus, a total of 34 plus 11, or 45 storage elements and the related control circuitry are required.

Illustrated in FIG. 17A are the buffer stages for the level ONE-THREE memories. Each buffer stage comprises a storage element, shown here as a SET-RESET flip-flop, and an associated control gate, functionally equivalent to an AND gate and so illustrated for simplicity. Each AND gate has two inputs. One input is connected to an information bit output of tape reader 402, i.e., one of the bits B-1 through B-4 and the other input is connected to the output of level counter 417 corresponding to the tape level from which information is to be secured.

Each flip-flop has a SET input connected to the output of its respective AND gate, and a RESET input connected to the X-1 control signal as hereinafter explained. Thus, the four buffer stages for the level ONE memory comprise flip-flop 422a–422d, and associated AND gates 424a–424d. The buffer stages for the level TWO memory comprise flip-flops 426a–426d and associated AND gates 428a–426d. The buffer stages for the level THREE memory comprise three flip-flops 430a–430c, and associated AND gates 432a–432c. (As will be recalled, only three information bits are required for level THREE.)

The information inputs for AND gates 424a–424d, and 428a–428d are provided by the B4–B1 tape reader outputs, respectively. The control inputs for gates 424a–424d are provided in common by the level counter L–1 output, while the control inputs for gates 428a–428d are provided in common by the level counter L–2 output. Similarly, the control inputs for AND gates 432a–432c are provided by the level counter L–3 output signal, while the information inputs are provided by the B4 through B2 tape reader signals respectively.

The X–1 RESET signal for flip-flops 422, 426, and 430 is generated by an OR gate 433 having a first input provided by the P–1 output of the tape advance treadle and a second output provided by a POWER SUPPLY START UP signal P–2. The latter is generated in conventional fashion within the system power supply (not shown) whenever the same is turned on to reset the various parts of the system to a rest condition. (The P–2 control signal may also be supplied to other portions of the system such as level counter 410, as will be understood by one skilled in the art in light of the above discussion, and further description and illustration is omitted in the interest of brevity.)

The X–1 signal is present at the start of read-in of a new instruction initiated by depression of a tape advance treadle, not shown, thus resetting all of buffer flip-flops 422, 426 and 428. Then, during read-in of level ONE from the tape, AND gates 424a–424d are activated by the L–1 level counter signal, and the information represented by its ONE-FOUR is transferred to flip-flops 422a–422d. The same process is repeated during read-in of levels TWO and THREE, with AND gates 428a–428d and 432a–432c activated by the L–2 and L–3 signals respectively at the appropriate times.

As mentioned above, flip-flops 422, 426 and 430 serve a buffer function for a second series of storage elements, comprising what may be termed an operating memory, the arrangement of which is illustrated in FIG. 17B.

Like the buffer stages, each stage of the operating memory is comprised of a SET-RESET flip-flop and an associated two-input AND gate. Thus, the level ONE operating memory stages are comprised of four flip-flops 434a–434d, and associated AND gates 436a–436d, the level two operating memory stages are comprised of four flip-flops 438a–438d, and associated AND gates 440a–440d, and the level THREE operating memory subsystem comprises three flip-slops 442a–442c, and associated AND gates 444a–444c. The SET inputs for flip-flops 434, 438, and 442 are provided by the respected outputs of the associated AND gates 436, 440, and 444, with the RESET inputs being provided in common by the L–4 level counter output. Signal inputs for AND gates 436, 440 and 444 are provided by respective outputs of buffer flip-flops 422, 426 and 430 (See FIG. 17A). The control inputs to all of AND gates 436, 440 and 444 are provided in common by the L–5 level counter output.

Since flip-flop 434, 438 and 442 are reset during read-in of level FOUR from the tape, it may be seen that while new lumber stop setting information is being read-in and stored in buffer flip-flops 422, 426, and 430, the previous instructions are retained, and not cancelled until level four is being read-in. Thus, no change in the position of the lumber stop takes place during storage of new information.

Then, during level FIVE read-in, the L–5 signal activates AND gates 436, 440 and 444 and the new information in the buffer flip-flops is transferred to the operating memory. This information is then employed to actuate the lumber stop assembly 17 and the sawyer instruction display 408, as hereinafter described.

The memory stages for levels FOUR-NINE are constructed in a similar fashion to operating memory stages for levels ONE through THREE. However, because no repositioning of mechanical members is directly controlled by the levels FOUR through NINE information, buffer stages are unnecessary.

Thus, the level FOUR memory is comprised of four AND gates 448a–448d each respectively connected to a SET input of one or four SET-RESET flip-flops contained in a storage bank generally denoted 450. The control inputs for AND gates 448a through 448d are provide in common by the L–5 output signal of level counter 410, while information inputs are provided by the B–1 through B–4 tape reader outputs respectively. The RESET input for all of the flip-flops in storage bank 450 is provided by the X–1 control signal, generated in the manner previously described.

The memory stages for levels FIVE through NINE are constructed in the same manner as the level FOUR memory state, each stage including a series of input AND gates and associated SET-RESET flip-flops. Thus, as illustrated in FIG. 17C, the level FIVE memory comprises a group of four AND gates 451a–451d connected to a four flip-flop storage bank 452, the level SIX memory comprises a group of four AND gates 453a–453d connected to a four flip-flop storage bank 454, the level SEVEN memory comprises a group of three AND gates 455a–455c connected to a three flip-flop storage bank 456, the level EIGHT memory comprises a group of four AND gates 457a–457d connected to a four flip-flop storage bank 458, and the level NINE memory comprises a group of four AND gates 459a–459d connected to a four flip-flop storage bank 460. As will be understood, the control signals for gate groups 451, 453, 455, 457, and 459 are provided by the L–5 through L–9 level counter outputs while the signal inputs are provided by the B–1 through B–4 tape reader outputs. The flip-flop SET inputs are provided by the respective AND gates, while the RESET inputs are provided by the X–1 control signal.

The Sawyer Instruction Display Console D in FIG. 23 is comprised of a series of indicators which provide a visual record of the information comprising a complete instruction. The numerical informaion in each of levels ONE through THREE, SIX, EIGHT and NINE is displayed on a multi-state decimal display element, for example a "Nixie" tube or the like, while the literal information in Levels FOUR, FIVE and SEVEN is displayed on simple illuminated indicia bearing display elements.

For the Levels ONE and TWO displays, two multi-state elements are necessary to accomodate the "tens" and "units" digits, while only a single multi-state display unit is required for Levels THREE, SIX, EIGHT and NINE. For Nixie tubes and similar decimal devices, binary to decimal converters are required to translate the binary information stored in the respective memory stages into decimal information for actuating the display. Suitable display-drive circuitry is also provided to operate the display in accordance with information generated by the binary to decimal converters.

With reference to FIG. 17B, the Level ONE display comprises a "units" display element 461 and a "tens" display element 62 operated by a display drive unit 63. Control information for display drive 63 is provided by a binary to decimal converter 64 connected to the outputs of flip-flops 34a–34d of the Level ONE operating memory. Similarly, the Level TWO display comprises a "units" display element 465 and a "tens" display element 466 operated by a display drive unit 467. Control signals for display drive unit 467 are provided by a binary to decimal converter 468 connected to the output of flip-flops 438a–438d in the Level TWO operating memory. The Level THREE display is comprised of a single multi-state display unit 470, a display drive unit 472, and a binary to decimal converter 474, connected to output of flip-flops 442a–442c in the Level THREE operating memory.

With reference to FIG. 14, it will be seen that the information represented by the fifteen characters in Level FOUR is not included for display as decimal numbers. Accordingly, as illustrated in FIG. 23 the display for this level is provided by a plurality of indicia bearing illuminated elements, two of which are shown at 478 and 480. Display control is provided by a four-input to fifteen-output translator circuit 476 coupled to the outputs of the four flip-flops in LUMBER SIZE storage bank 450.

The level FIVE display requires thirteen non-decimal characters. Thus, the display is provided by 13 illuminated elements, three of which are indicated at 486, 488, and 490 and a four-input — 13 output translator 491 coupled to the output of LUMBER NAME storage bank 452. Also, the Level FIVE display translator 491 provides "M" and "N" control signals representing the MARK and NOTCH instructions, respectively, for actuation of portions of the cutting system control unit 406 as hereinafter described.

The Level SEVEN display is constructed like the Level FIVE display, and includes three illuminated display elements 492, 494, and 496 representing the DOUBLE, TRIPLE QUADRUPLE operator instructions respectively. The display elements are operated by a three input-seven output translator 497 connected to the output of SPECIAL INSTRUCTION memory bank 456. The Level SEVEN display translator 497 also provides C–1, C–2, C–3, and C–4 control signals used to actuate the spray head solenoids 334R, 334G, 334B and 334B1 respectively. The signals C–1 through C–4 correspond to RED, GREEN, BLUE and BLACK marking instructions respectively.

The Level SIX, EIGHT, and NINE display units are constructed like the level THREE display unit. The Level SIX display includes a binary to decimal converter 490 connected to the output of the flip-flop in the NUMBER OF PIECES storage bank 454, and a multi-state display element 504, such as a "Nixie" tube connected to binary to decimal converter 498 by a suitable drive unit 499. The Level EIGHT display includes a binary to decimal converter 500 and a multi-state display element 506 connected to binary to decimal converter 500 by a suitable drive unit 501. The Level NINE display includes a binary to decimal converter 502 and a multi-state display unit 508 connected to binary to decimal converter 502 by a suitable drive unit 503.

To provide an orderly display, the signal paths for all of the Levels ONE through NINE display indicators may be completed in common through a single control path designated X–2 in FIGS. 17 rather than directly to a low voltage point. The X–2 control path is actually completed through the SET-RESET flip-flop 514 (See FIG. 17C) with the output of the flip-flop so connected that the signal path X–2 is at a low voltage when the flip-flop is in the SET condition.

The RESET input for flip-flop 514 is provided by the X-1 control signal while the SET input is provided by the L–9 level counter output. Thus, in response to the X–1 control signal generated at the beginning of a tape reader instruction input cycle, flip-flop 514 is reset opening the signal return path for all of the display unit and thereby extinguishing all of the illuminated displays. As the information comprising an instruction is read in and stored in the respective memory stages, actuating signals for the display elements are provided but the display elements are not illuminated since the signal paths are not completed. After all the information has been read in, the L–9 Level counter signal sets flip-flop 514 thereby completing the signal path for the display elements. This allows all of the display elements to be illuminated simultaneously with all the information pertaining to a new instruction rather than in sequence over the approximately 1 second time period required for read in of a complete instruction.

As will be recalled, the purpose of the ZERO or TRANSITION Level in the instruction format is to place the numerical control system in a rest condition in preparation for execution of cutting or marking instructions, or in readiness for receipt of a new instruction. Since the existence of the TRANSITION Level is indicated by the presence of Bit SEVEN on the tape, the B–7 tape reader output is used directly to operate a suitable indicator 510 (See FIG. 17C.)

In addiion to operating the Sawyer's Instruction Display Console D, the information contained in Levels ONE through THREE, and certain portions of the information contained in Levels FIVE and SEVEN, is used to control the operating functions of the cutting machine. As previously explained, the lumber clamping and saw elevating assembly 21, the lumber discharge mechanism including fixed and moving lumber unloading cylinders 210 and 194 respectively, and the marking device 23 ard controlled pneumatically by an electro-mechanical control system generally denoted at 406 in FIG. 16.

Referring to FIG. 13, it will be recalled that the lumber stop assembly 17 is controlled by a series of binary pneumatic cylinders L1/8–L96, activated by two position-four way valves V⅛–V96 respectively. Valve operation is controlled by solenoids S⅛–S96 illustrated in FIG. 17 B. Solenoids S96 through S12 provide 8–4–2–1 binary code control signals for the "foot" selection cylinders L96-L12, solenoids S8–S1 provide similar control signals for the "inch" selection cylinders L8–L1, and solenoids S½ through S⅛ provide a 4–2–1 binary code control signal for the "eights" selection cylinders L½ through L⅛. As illustrated in FIG. 17B, each of solenoids S96 through S⅛ is actuated by an amplifier A1 through A11 connected to the outputs of the flip-flops 434a–d, 438a–d, 442a–c, respectively, in the Levels ONE through THREE operating memories.

Referring to FIGS. 17C and 13, the "M" "N" signal outputs of LUMBER NAME translator 491 are connected through a pair of amplifiers 520 and 522 to actuate MARK interlock solenoid 285 and NOTCH solenoid 309. As will be recalled, solenoids 285 and 309 serve to shift spray interlock valve 284 and notch control valve 308 respectively from the normal flow states to the off-normal flow states, thereby providing control for execution of the marking and notching functions respectively.

With continued reference to FIGS. 17C and 13, it will be recalled that the marking function provides visual part location instructions on the top and bottom plates. The color coded marking designates the location of standard studs in red, the locations for openings of doors and windows in green, the locations of tees for transverse wall intersections in black, and the location of room or building corners at the ends of panels in blue.

Color selection is provided by control valve 336 which connect marking dye pressure pots 234 respectively to the atomizing spray heads 228 and 230 on marking device 23. Vavles 336R, 336G, 336B and 336B1 are operated by respective solenoids 334R, 334G, 334B and 334B1 in response to the C-1 through C-4 signals generated by SPECIAL INSTRUCTIONS translator 97 in Level SEVEN display unit.

As illustrated in FIG. 11, the C-1 through C-4 signals are connected as signal inputs to AND gates 340. Pressure sensitive switch 330 connected to the spray bezel actuating cylinder 220 provides the control signal for AND gates 340. Thus, the presence of the pressurized air in line 326 above a predetermined pressure causes operation of switch 330 and conditions one of gates 340 to pass a signal depending on which of signals C-1 through C-4 is present. The outputs of AND gates 340 are connected to suitable amplifiers 342 which provide operating current for the color selection solenoids 334. Thus, when the "M" signal is present, one of the C1 through C4 signals is also present, and the marking cycle is substituted for the cutting cycle, as described below.

Display Console

Referring now to FIG. 23, there is illustrated the face of display console D which displays to the sawyer the information generated by the numerical control system previously described. As previously noted, there is displayed the various lumber sizes ranging from a 2 × 2 to a 4 × 12 and including a 1 × 3, 1 × 4 and special SPC indication, the lumber sizes being indicated at 500 in the drawing. Thus, by noting the lumber size as illuminated in reponse to the tape instruction, the sawyer can select the proper lumber size. Indicated at 502 are the various display elements bearing the lumber names of the non-standard parts and which names identify the functions of the parts in the frame. There is also indicated a notch cutting indication at BPN. The following columns list the full name adjacent its abbreviation as provided on the display console D.

| Abbreviated Name | Actual Name |
| --- | --- |
| JCK | Jack |
| COR | Corner |
| SSH | Short Stud |
| CRP | Cripple |
| BPN | Bottom Plate Notch |
| HDR | Header |
| HED | Head |
| SIL | Sill |
| VTP | Very Top Plate |
| PLT | Plate |
| TEE | Tee construction |
| SPL | Special Name |

Accordingly, when a display element of group 502 is illuminated, the sawyer is informed of the type of member to be formed, that is, its function in the frame. Should the element BPN be illuminated, the sawyer is informed that a notch is to be formed in the bottom plate. There is also provided on display console D three display elements which provide special instructions to the sawyer for forming compound pieces utilizing the unit nailer. These instructions are indicated at 504 and the abbreviations and actual meanings therefore are listed in columnar fashion below.

| Abbreviated Name | Actual Name |
| --- | --- |
| DBL | Double |
| TRL | Triple |
| QDR | Quadruple |

When any one of these display elements is illuminated, the sawyer is accordingly informed that one or more of the pieces being cut are to be secured to one another or to a standard stud or both as will be indicated.

An indicating light 506 is provided on console D, the illumination of which indicates to the sawyer that the tape is in a part position for a new instruction. There is also an indicator light 508 to indicate to the sawyer that the operation to be performed on a piece is a marking operation. Also indicated on display consold D at 508 is the length of the piece to be cut. As previously noted, the length is displayed in numerical form in feet, inches and eighths of inches. Thus the sawyer, when given this length information can select a board length preferrably slightly greater than the given length information in order to provide the frame assembler a piece cut to the proper length. Indicated at 512 is a numerical display of the number of pieces which are to be cut of a specified part. There is also provided on display console D at 514 a number which indicates the panel number of which the parts cut or marked by that instruction will form a part, the indicated panel being usually one of a series of panels which will eventually form the wall panels of a completed structure.

OPERATION

Referring now to FIG. 24, there is illustrated serially arranged sets of instructions on tape format for measuring, marking and cutting the non-standard pieces of the interior wall partition illustrated in FIG. 1B, it being appreciated that the standard parts of the frame, for example studs ST are preferably precut and supplied to the frame assembler without cutting at station 12 (FIG. 1F) although such studs could be cut by the saw S at station 12 if desired. A second instruction is also shown on the end of the serially arranged tape for starting the marking operation along the plates of the exterior panel illustrated in FIG. 1A. The lower portion of the completed interior partitions of FIG. 1B is illustrated FIG. 20. The length information in the first three levels in each instruction represents information for locating the travelling stop SP along the cutting surface of table 15 predetermined distances from the stop side face of cutting blade 42. The length information on the tape is therefore given in terms of distance that the stop SP is to the left of the rear face of saw blade 42. For purposes of describing the marking operations utilizing length information in the first three levels of each instruction, the left edge of spray block 224 on device 23 is located 3 and one-fourth inches from the left face of cutting blade 42 between blade 42 and stop SP and, accordingly, when measuring the distance a mark lies from the end of a board in preparing the tape instruction, the 3 ¼ inch distance is added to the actual distance between the left edge of marking block 224 and stop SP as all distance measurements are preferably given in distances from the left face of saw blade 42 to stop SP. Obviously, the distance between saw blade 42 and spray block 224 could be altered as desired and obviously other points of reference could be utilized in providing the length information on the tape format. For purposes of illustration and to facilitate the following description of the fabricating machine, the interior partition illustrated in FIG. 1B has the following dimensions: studs ST1 – ST4 and ST7 – ST9 lie on 16 inch centers; the studs as well as all other non-standard parts excluding header HDR are 2 × 4's having nominal widths of 1 ⅝ inches; the door frame measures 32 inches across between the inside faces of the jacks; the centerlines of studs ST5 and ST6 are 12 inches apart; and standard length long studs for an interior partition are employed.

Referring now to FIG. 24 in conjunction with FIGS. 14, 20 and 1B, the first tape instruction provides information representing the length of the lumber to be utilized, the lumber size, the identity of the lumber part as utilized in the frame, the number of such parts and the panel number in which such part or parts will be employed. It will be appreciated that instructions for marking and cutting the top and bottom plates are normally provided in the first tape instruction for any one panel as the plates constitute basic portions of the frame to which all other parts are secured. Accordingly, the first tape instruction provides length information representing the length of the top and bottom plates which corresponds to the length of the partition of FIG. 1B, i.e., 11 feet 3 ⅜ inches. The plates of this frame are 2 × 4's and two plates are fabricated simultaneously as they are identical (except for the notching as described hereinafter), these plates forming the top and bottom plates of a frame, for example, frame member 10 of a plurality of frames forming a specified building structure.

To translate the information on the first tape instruction into actuation of the various solenoids and display solenoids on console D, the sawyer actuates a tape advance treadle, not shown, whereupon the first set of taped instructions are advanced through tape reader 402. The information on the tape in each level is stored in the respective portions of the memories and actuates the required ones of the solenoids and indicators in a manner previously described. Particularly, the first tape instruction provides a readout on display console D of the length and size of the lumber to be utilized and the fact that two pieces are required. The sawyer, upon noting that the plate without cut symbol PWC, is displayed on console D, realizes that the plates are to be marked first prior to cutting and that marking instructions are provided on subsequent tape instructions prior to any cutting instructions. Having noted the lumber length and size and the number of pieces required, the sawyer again actuates the tape advance treadle to obtain the marking information represented in the second set of tape instructions. In the meantime, the sawyer selects two pieces of lumber preferrably slightly greater in length than the lumber length indicated on the display console at and of the proper size. The sawyer then locates two boards each a 2 × 4 having a length slightly greater than 11 feet 3 ⅜ inches on the cutting surface in side by side relation one to the other as indicated in FIG. 21. Since the indication on display console D is PWC (plate without cut) the sawyer is informed, as previously noted, that a cut will not be made in response to the first tape instruction.

The information contained in the various levels of the second tape instruction is stored in the respective parts of the memories and the various solenoids and indicators are again actuated in response thereto as previously described. Particularly, display console D indicates a length of 3 ¼ inches, a lumber size of 2 × 4, a mark signal MRK, the number of pieces to be marked, and the panel number 10. In the manner hereinbefore, generally described, the length information 3 and one-fourth inches is translated by the electrical system into actuation of selected solenoids i.e., solenoids S¼, S1 and S2. Actuation of these solenoids shifts the corresponding valves V¼, V1 and V2 to provide air to the associated stop positioner cylinders L¼, L1 and L2 to advance the cylinders or piston rods, as the case may be, a predetermined distance from the fixed end of the serially connected cylinders L. By employing a step of gear ratio of 4:1 in stroke multiplier 19, the actual distance of movement of the last cylinder L96 in response to the second tape instruction is thirteen-sixteenths in which results in movement of stop SP along the cutting surface the required distance of 3 ¼ inches from the near or left face of saw blade 42 as illustrated in FIG. 2. Stop SP is accordingly located directly adjacent spray block 224 as left edge of block 224 is preferrably located about 3 ¼ inches from the near face of saw blade 42. The sawyer is informed in the instruction that both pieces will be marked by the display of the mark indication and the number of pieces on console D. The sawyer then butts the ends of the boards, their left ends in FIG. 2, against stop SP and against fence 38.

To actuate the fabricating device and to commence either the marking or cutting operations including the notch cut operation as will be described, the sawyer then depresses the start treadle P which shifts valve 282 to provide air into control line 280 from supply conduit 250 as illustrated in FIG. 13.

The marking instruction in tape level 5, however, has been translated by the electrical control system, as previously described, to provide a marking output signal M which, in turn, is applied to and actuates through an appropriate amplifier, the interlock solenoid 285 which then shifts spray interlock valve 284 to provide supply line air into line 326 and into the head end of spray bezel cylinder 220. Marking block 224 is thereby lowered to clamp the upper faces of the plates against the cutting surface. When the air pressure in line 326 builds up to a predetermined pressure, pressure switch 330 closes to provide an electrical input signal to AND gates 340.

The color marking instruction red represented in Level 7 of the second tape instruction which, as previously noted, identifies the location of the intermediate part along the plates as well as its character as a stud, is translated by the electrical control system to provide an output signal C1. Signal C1, in turn, provides an input to AND gate 340R which is coupled to the actuating solenoid 334R for the spray head actuating valve 336R. The combined signals to AND gate 340R (signal C1 and the input signal provided by closing pressure switch 330) actuates solenoid 334R to shift valve 336R whereby dye in dye pot 234R is proided under pressure from air supply source 340 to the corresponding nozzles 228R and 230R on opposite sides of nozzle mounting plate 226. Thus, red dye is applied along the right-hand edge of block 224, to apply a mark across the upper faces of the top and bottom plates, for example, the red dye marking illustrated across the bottom plate at MK1R in FIG. 20 to locate and identify stud ST1. When the sawyer observes that the marking operation is complete, he releases the start treadle P whereby valve 282 returns to it normal position exhausting air line 326 and permitting pressure switch 330 to shift to its normally open position thereby voiding the input signal to AND gates 340. By exhausting line 326, spring biased piston rod 222 by spray cylinder 220 retracts spray block 224 to its normal elevated position to thereby unclamp the plates. Note, in effect, that actuation of spray interlock valve 284 disables or precludes operation of the saw and clamp cylinder 50 and unloading cylinders 194 and 220.

Having completed the first marking operation, the sawyer again advances the tape whereby the information in the third tape instruction is translated by the electrical control system into actuation of the selected solenoids and indicators. For the frame illustrated in FIG. LB, the third and fourth tape instructions provide marking information for locating the position of studs ST2 and ST3 along both the top and bottom plates as well as information identifying the character of such intermediate parts as studs by utilizing the red colored dye. The length information in these instructions will, in the manner described, locate stop SP predetermined distances from the near face of saw blade 42 whereby the red marking dye can be applied to the inside faces of both top and bottom plates similarly as described in connection with the operation of the electrical, and pneumatic circuits in the second tape instruction. The sawyer, of course, successively butts the plates against the stop SP and actuates the marking circuits by actuating the start treadle P to accomplish this marking operation. The marks will appear along the bottom plate as at MK2R and MK3R in FIG. 20 (similarly as the top plate) with each mark comprising a pair of spray coatings defining an unsprayed area therebetween which, in the spraying process is blocked out by block 224, and against which the associated intermediate parts of the frame are butted in final assembly of the frame.

Referring now to the fifth tape instruction, the information represented thereby is translated not only to locate stop SP a predetermined distance from the marking spray block and instruct the spray control circuit to apply a mark to indicate the location of stud ST4 along the top and bottom plates, but also to provide an indication of an opening, i.e., a door frame, at that location. The length information in Levels 1 through 3 of the fifth instruction is translated through the electrical and pneumatic control circuits to locate stop SP 4 feet 3 ¼ inches to the left of the near face of saw blade 42, or 4 feet from the left edge of spray block 224. Particularly, the length information is translated by the electrical control system into signals for actuating solenoids S48, S2, S1 and S¼ to shift the corresponding valves V48, V2, V1 and V¼ to admit air into the associated cylinders L48, L2, L1 and L¼ to advance the final cylinder L96 away from the fixed end of the cylinder train a distance of 1 foot 13/16 inches which, through the stepped up gear ratio of stroke multiplier 19, provides for a displacement of the stop SP a distance f 4 feet 3 ¼ inches from the near face of the saw blade 42. Thus, the stop SP is disposed the desired 4 feet from the left edge of marking block 224. After the sawyer positions the ends of the boards (which will form the top and bottom plates TP and BP respectively against stop SP and against fence 38, start treadle P is depressed to provide supply line air to line 280. The mark indication in the fifth level of the fifth instruction is translated by the electrical circuit, previously described, to provide an output signal M which actuates solenoid 285 to shift valve 284 to provide air into line 326 for actuation of spray cylinder 220 as previously described. Also, pressure switch 330 closes in response to a predetermined pressure built up in line 326 to complete an electrical circuit to provide an input signal to AND gates 340. The green color indication provided in the seventh tape level of this instruction (indicative of stud ST4 as well as the fact that it defines the location of an opening in the finally assembled frame) is translated by the electrical circuit into an output signal C2 which is applied to AND gate 340G, the combined signals providing an output for actuating solenoid 334G. Actuation of solenoid 334G shifts valve 336G to provide dye under pressure from green dye pot 234G to nozzles 228G and 230G on opposite sides of nozzle plate 226. Thus, after block 224 clamps both plates against the cutting surface and the air pressure closes pressure switch 330, solenoid 334G actuates valve 336G and green dye is applied to the upper faces of the top and bottom plates to mark the location of stud ST4 as well as identifying it as defining the location of one side of an opening in the frame. This dye marking along the bottom plate is indicated at MK4G in FIG. 20. When the sawyer observes that sufficient dye has been applied, treadle P is released resulting in deactuation of solenoid 334G, the exhausting of line 326, the opening of pressure switch 330, and the raising of spray block 226 as previously described.

As illustrated in FIGS. 1B and 20, it is desirable for reaons noted previously to provide a transverse notch through the underside of the bottom plate to facilitate cutting through and thereby removing the plate portion between the jacks defining the door frame when the frame has been installed at the construction site. The notches lie in alinement directly below the inner faces of the jacks defining the door frame D. Information on the next serially arranged tape instruction 6 provides cutting instructions for the first notch adjacent the jack associated with stud ST4. As illustrated in FIG. 24, instruction 6 includes; length information for locating stop SP a distance from saw blade 42 corresponding to the distance of notch from the left-end of the bottom plate, i.e., 4 feet 3 ¼ inches, information representing lumber size, information representing cutting and display instructions for providing a bottom plate notch BPN and information representing that two pieces of lumber are to be disposed on the saw table and the panel number 10.

As described previously, the length information contained in Levels 1–3 is translated by the electrical and pneumatic circuits to locate stop SP 4 feet 3 ¼ inches from the near face of the saw blade 42 similarly as described previously in connection with the length information provided by instruction 5. The bottom plate notch information represented in the fifth tape level of the sixth instruction is translated by the electrical circuit to provide an output signal N which, through a suitable amplifier illustrated in FIG. 13, actuates solenoid 309 to shift notch control valve 308 to the left. By shifting valve 308, saw return valve 298 is placed in communication with air flowing through supply line 250 via line 306. The remaining information in the sixth instruction actuates the appropriate indicator elements in console D as previously described.

After the sawyer has located the ends of the partially marked plates against the stop SP (which now lies in the selected position for the notch cut) with the bottom plate lying against fence 38 and the top plate outwardly thereof, the sawyer actuates the start treadle P to provide control line air via lines 250 and 280 to the pilot valve associated with saw actuating cylinder control valve 256 whereby the latter shifts to the right in FIG. 13 to provide air from supply line 250 through valve 256 and line 258 into the head end of the saw and clamp cylinder 50. The piston of cylinder 50 is extended and saw guard 41 lowers to clamp the plates against the cutting surface. The saw blade 42 thereafter is elevated to start the notch cut in the bottom plate, the clamping and sawing operations being previously described.

As illustrated in FIG. 21, the axis of saw blade 42 lies below fence 38 such that the saw blade makes a slightly arcuate notch cut through the bottom plate which is adjacent fence 38. A very small negligible notch is cut in the lower inside corner of the top plate as the saw blade 42 makes the desired notch cut through the bottom plate.

To preclude a complete cut through both plates, saw arm 43 engages an actuating lever on saw return valve 298, when the saw reaches an elevation sufficient to accomplish the notch cut but prior to cutting through the plates, to shift valve 298 to the left in FIG. 13. Air is provided via lines 250 and 310, through valve 308 which has been previously shifted by the imposition of notch signal N on solenoid 309, line 306, valve 298, shuttle valve 294, and line 292 to the pilot valve on the opposite side of the saw actuating cylinder control valve 256. Valve 256 thus shifts to the left in FIG. 13 providing air via supply line 250 to the rod side of cyinder 50 to lower saw blade 42 and raise saw guard and clamp 41 before the saw is elevated any further. Saw blade 42 thus returns to its retracted position with the result that the desired notch has been cut in the bottom plate. The top plate, of course, is not notched due to the location of the saw blade relative to the position of the top and bottom plates on the saw tables.

Once the first notch is cut, the sawyer advances the tape and the next instruction 7 provides information for cutting the second notch along the bottom plate on the opposite side of the door frame. As before, the length information in instruction 7 is translated to locate stop SP a distance of 6 feet 11 ¼ inches from the near face of saw blade 42 and the saw electric and pneumatic control circuits operate as previously described in accordance with instruction 6 to make the notch cut.

The eighth tape instruction represents information for providing a mark at the location of stud ST5 on the opposite side of the door frame and also to identify the fact that stud ST5 defines the other side of the frame opening. The length information in instruction 8 is translated by the electrical and pneumatic circuits to locate stop SP 7 feet 4 ⅛ inches from the near face of the saw blade 42, which, in turn, locates the left edge of spray block 224 the desired 7 feet and seven-eighths inch from stop SP. Thus, when the board ends are butted against stop SP, spray block 224 is located directly over the location of stud ST5 on the inside faces of the top and bottom plates. In the manner previously described, the marking instruction in the fifth level provides through the electrical circuit, an output signal M which operates to shift valve 284 and hence actuate spray cylinder 220 and provide an electrical input to AND gates 340 by closing pressure switch 330. The green dye information in Level 7 of instruction 8 is translated into an electrical signal C2 by the electrical control circuit. The combined signals on the AND gate 340G actuates solenoid 334G which, in turn, shifts the corresponding valve 336G to provide a green dye mark on opposite sides of block 224 onto the upper face of the plates to define the position cf stud ST5. After the dye mark has been applied, the sawyer releases treadle P with the result that the spray cylinder retracts and the spray control circuit is de-energized.

The next stud ST6 in the frame comprises the first stud of a Tee construction, it being recalled that stud ST6 is located 12 inches from the stud ST5. Accordingly, length information is provided in instruction 9 to locate stop SP 8 feet 4 ⅛ inches from the near face of saw blade 42 with the result that, when the ends of the boards are butted against stop SP, the near edge of block 224 lies the desired 8 feet and seven-eighths inches from stop SP. The mark information in the fifth tape level of instruction 9 provides, through the electrical control circuit, output signal M which actuates valve 284 to, in turn, actuate spray cylinder 220 and provide an input signal to AND gates 340 as described previously. As a Tee construction is required, the seventh level in instruction 9 provides information representing a black dye marking for straddling the location of the first stud ST6 of the Tee construction. This seventh level dye color information is translated through the electrical control circuit as previously described to provide an input signal C4 for AND gate 340B1. The signals on AND gate 340B1, in turn, actuate the corresponding solenoid 334B1 to shift valve 336B1 to the right in FIG. 13 to provide black marking dye under pressure to the nozzles 228B1 and 230 B1 on opposite sides of plate 226. Once the black dye has been applied to the plates in a position straddling the location of stud ST6, the sawyer releases treadle P to deactivate the spraying cylinder and spray solenoids. The sawyer then advances the tape so that the machine can receive the next instruction.

While it is possible to provide an instruction for marking the location of the right hand stud ST7 of the Tee along the top and bottom plates, it is not necessary as the frame assembler, when he observes a black dye marking on the plates, knows, not only that a Tee construction is to be provided at that point along the plates but also that the black dye marks the location of the left hand stud of the Tee construction.

The next instruction 10 provides length and marking information for the next stud ST8 whereby stop SP will be located a predetermined distance from marking block 224 and the red marking dye will be applied, all in a manner similarly as previously described, particularly with respect to instruction 2.

The next instruction 11 will be to mark the location of the end stud ST9. It will be observed that the length information in this instruction locates stop SP a distance from the near face of saw blade 42 greater than the length of the plates since the marking device is located 3 ¼ inches on the left side of the saw blade. Accordingly, length and marking information is translated through the electrical and pneumatic control circuits to locate stop SP in position to locate the left-hand edge of marking block 224 a distance of 11 feet 1 ¾ inches from stop SP. The mark is colored red to indicate a stud. The end marking is necessary as the end piece could either be a stud or a corner and the assembler is provided the information as to what piece is provided on the end of the plate by the red as opposed to the blue marking indicia.

The next instruction is for cutting both plates to the required lengths. As noted previously, the plates are 11 feet 3 ⅜ inches long and this information is provided on the first 3 levels of instruction 12, and through the electrical and pneumatic control systems previously described, actuates the length positioners cylinders to locate stop SP 11 feet 3 ⅜ inches from the near face of saw blade 42. The fifth level of instruction 12 provides information to indicate PLT on display console D, which, in turn, indicates to the sawyer that the lumber is ready to be cut to the desired length. As previously, the sixth tape level reresents information that both plates are to be cut. With the ends of the boards butted against stop SP, the sawyer presses start treadle P to provide control line air to the pilot valve of saw actuating cylinder control valve 256 shifting it to provide air via lines 250 and 260 to the head end of saw and clamp cylinder 50. Clamp guard 41 lowers to clamp the plates against the cutting surface and saw blade 42 is elevated to provide a cut through both boards. While the saw arm 43 actuates saw return valve 298, it merely places shuttle valve 294 in communication with exhaust line 306 through notch control valve 308. Upon completing its cut through the plates, arm 43 engages an actuating lever on saw return valve 302 to shift it to air from supply line 250, via line 310, valve 308, lines 312, 301, 300, shuttle valve 294 and line 292 to a pilot valve on the other side of saw control valve 256 to return the latter to its normal position. When returned, air is provided via lines 250 and 258 to the head end of cylinder 50 to elevate saw clamp 41 and retract saw blade 42 below table 53. When saw return valve 302 is shifted, air is also supplied to a pilot valve for shifting delay valve 304 to the right in FIG. 13 to provide air via lines 250, 314, valve 304 and line 316 through a flow control valve 318 to a pilot valve for unloading cylinder control valve 272. Valve 272 shifts to the left in FIG. 13 to provide air via lines 250 and 274, through valve 272, and lines 271, 270 to the head ends of the fixed unloading cylinder 210 and travelling stop unloading cylinder 194 via lines 266 and 268 respectively. Extension of the piston rod in fixed unloading cylinder 220 engages pusher head 216 against the bottom plate to displace the ends of both plates adjacent the saw across the table and onto ramp 34. Simultaneously, extension of piston rod 192 on the travelling stop unloading cylinder 194 pivots blade 180 to sweep across the table displacing the ends of the plates adjacent stop SP across the table onto ramp 34. Air through valve 272, when shifted to the left in FIG. 13, is also provided through a flow control valve 332 and a reservoir R in communication with a pilot valve on the opposite side of valve 272. After a predetermined time delay, the pilot valve shifts valve 272 to the right in FIG. 13 once again placing the rod end of fixed unloading cylinder 210 in communication with air in supply line 250 to return pusher head 216 to its normally retracted position. Air on the head side of travelling cylinder 194 is exhausted via lines 268, 270 and 271 through valve 272. A spring returns piston rod 192 to its retracted position, the blade pivoting back to its normal position with the blade tip underlying fence 38. Accordingly, the plates are cut through and then automatically discharged from the conveyor table onto ramp 34 for disposition on, for example, the conveyor CV illustrated in FIG. 1F.

After discharge of the plates from the saw table for transport to a frame assembler, the sawyer advances the tape to receive the next instruction. Once the plates have been cut, the non-standard intermediate pieces of the same interior partition are then cut and in order of their assembly for example, from left to right in FIG. 1B. The next instruction 13 therefore provides information for cutting the jacks to the required length as well as identifying the parts so cut as jacks and indicating that they are to be nailed to an adjacent stud in face to face relation therewith. The height of a door frame is conventionally 6 feet 10 inches and the jacks are therefore provided in lengths of 6 feet 8 ⅜ inches as they sit on bottom plate BP. Accordingly, this latter length information is represented in the first three levels of tape instruction thirteen with level four identifying the lumber size, i.e., a 2 × 4. Level five identifies the parts to be cut as jacks and level six indicates the number of pieces to be cut, in this instance, two jacks. Level seven provides information representing the disposition of the jack with a stud as a compound piece, in this instance a double piece. As will be appreciated, the jack is nailed in butting face to face relation with a standard stud to form the door frame. When the sawyer is apprised that the items to be cut are jacks and that they are to be doubled, this indicates to him, or to the operator of the unit nailer in FIG. 1F if the sawyer and unit nailer operator are not the same, that the jacks are to be nailed to a standard stud to provide a two part compound intermediate piece. Accordingly, the the sawyer selects two pieces of lumber having a length greater than the indicated 6 feet 8 ⅜ inches, and of a 2 × 4 size and disposes them in side by side relation on the saw table. The length information on the tape is translated through the electrical and pneumatic control circuits thereof to actuate the stop position cylinders whereby stop SP is located 6 feet 8 ⅜ inches from the near face of saw blade 42. The sawyer then actuates the start operation treadle P whereby air is supplied successively to the opposite ends of saw and clamp cylinder 50 in a manner previously described to clamp, saw, retract, and then release the boards. Air is also supplied as previously described to the head ends of unloading cylinders 194 and 220 to automatically discharge the jacks from the saw table onto ramp 34 as described previously in connection with the discharge of the top and bottom plates from the table.

The next instruction, not shown, on the tape would represent information for cutting and identifying the pair of cripples CRP located above head H and below header HDR in the frame. The cripples would be cut similarly as the jacks and discharged from the saw table. Similarly, successive tape instructions would provide for the cutting and identification of both the heads and header and for their automatic discharge from the saw table. The jacks and their associated studs can be nailed together at the unit nailer with the remaining portions of the door frames secured in place at the final assembling station. After cutting the jacks, cripples, head and header, the next instruction, not shown, will identify the next nonstandard piece, which, in this case, is the Tee construction. This tape instruction will contain information in levels five and seven respectively, identifying this next non-standard part on console D as a Tee and identifying it as a quadruple piece. This information will be translated through the electrical control circuit for display on the console D. The quadruple indication in conjunction with the identification of a Tee construction informs the sawyer that the Tee construction comprises two standard studs spaced one from the other by a plurality of pairs of blocks, the T*ee* construction being four stud widths. The T*ee* is constructed on the unit nailer per its indication on the console D.

After completing measuring, cutting and marking operations for the non-standard parts of the interior partition illustrated in FIG. 1B, the next instruction on the tape will contain information representing the measuring, cutting and marking information for the parts of the next frame, for example, the exterior panel illustrated in FIG. 1A. As in the previous case, the first tape instruction will provide information representing lumber length, size, identification of the part to be cut, the number of pieces of that part to be cut, and the panel number of the frame into which such parts are assembled, for example, the next panel number 11. In other words, the tape format will be similar to instruction 1 for panel No. 10. The sawyer will, in accordance with the new instruction, select the proper length of boards to form the top and bottom plates of the exterior panel and will dispose such boards on the cutting surface and advance the tape to the next instruction as previously described. As seen in FIG. 24, the second instruction for the exterior panel provides information representing the location of the first stud along the top and bottom plates and in addition provides information identifying that stud as part of a corner construction, i.e., a blue mark on the plates. Particularly, levels one through three of the second tape instruction for frame No. 11 represents length information of 3 ¼ inches whereby, through the electrical and pneumatic control system previously described, stop SP will be located 3 and one-fourth inches from the near face of saw blade 42 and adjacent the near edge of spray block 224. The fourth level in instruction two for panel number 11 represents a lumber size, i.e., a 2 × 4. The fifth level represents that a mark is to be applied to the plates with the sixth level indicating that two pieces of lumber are to be cut forming the top and bottom plates. Level seven represents information indicating the type of piece to be disposed on this first mark between the top and bottom plates. In the exterior panel of FIG. 1A, the first stud also comprises a portion of the corner construction and a blue marking will appear on the top and bottom plates to indicate a corner construction as well as the location of the first stud of such construction. The tape instruction is translated to actuate the selected solenoids and indicators as previously described to mark the top and bottom plates as indicated at MK1B in FIG. 19 with a blue dye marking. The assembler, when he receives the plates and observes the blue dye marking, will at once realize that a corner is disposed between the top and bottom plates at the ends of the plates with the first stud of the corner being located to the left of the mark MK1B. The corner construction per se is formed on the unit nailer per subsequent tape instructions after the plates are cut and discharged from the saw table.

After the fabricating device has marked the location of the first stud between the plates and identified it as a corner the plates are marked to identify the locations of the succeeding intermediate parts. It is not necessary to identify the location of the second stud ST2 forming the other stud of the corner construction as the corner construction per se is provided as a compound piece directly to the assembler. Thus, the next tape instruction will be marking instructions for locating and identifying stud ST3 and this is accomplished in a similar manner as described. Similarly, the location of studs ST4, ST5 and ST6 are marked along the top and bottom plates, the red markings identifying such intermediate parts at each such location as studs. A subsequent tape instruction for locating stud ST7 along the top and bottom plates is provided. However, the instruction will provide for a green marking dye locating stud ST7 as it forms the first part of a compound piece defining an opening, in this case a window. The instruction for stud ST7 will accordingly and among other information have length information for positioning stop SP a predetermined distance from the edge of spray block 224 and, in level seven, information providing for the application of a green dye.

The next series of instructions represents information for locating short studs SSH8 and SSH9 along the plates. The red dye mark is utilized for this purpose. The assembler, however is aware, since he has previously disposed a triple comprised of stud ST7, its associated jack, and a short stud SSH8 with the stud straddling the green dye markings, that the subsequent red indication prior to any further green indication signalling the other side of the opening, means that short studs are located along the bottom plate, the short studs being provided immediately after the triple compound piece. After the short studs SSH9 and SSH10 are marked, the next tape instruction represents length information for locating the stud ST12 and the green marking on the plates required by this instruction will identify that location as the other side of the opening. The next tape instructions will indicate the locations of studs ST13 and ST14 along the plates and identify such parts as studs by the red dye marks.

After the plates are cut, the tape instructions provide information representing the length and identity of the parts intermediate the plate. For example, in the panel illustrated in FIG. 1A, the first tape instruction for the intermediate parts will represent information identifying the first non-standard part as a corner and a triplet which information will be processed by the electrical circuit for display as COR and TRL on console D. A unit nailing operation is effected in response to this information and the non-standard intermediate corner construction is conveyed to the assembler as a unitary piece. It will be appreciated that the assembler is provided a supply of standard stud S from which he draws the studs for disposition between the plates on a layout or automatic nailing machine in accordance with the locations of the red dye markings. The next tape instruction for the intermediate parts will provide the length information for cutting the pair of jacks defining the window W with the further instruction that the part is a triple TRL. Thus, the jacks are cut to the appropriate length in the manner previously described. The next tape instruction provides information identifying and representing the length of short studs SSH8 and SSH11, and indicates these parts as a triple. These short studs are then cut to length and, in accordance with the triple TRL indicated on console D, a short stud and jack each are nailed to studs ST7 and ST12 to form the triple compound pieces defining the window opening W. Successive tape instructions would provide cutting information for forming and identifying short studs SSH9 and SSH10, head HD, header HDR, and cripples CRP.

It will be appreciated, that the non-standard intermediate frame parts are thus provided the assembler in the order in which they will be assembled to form the complete frame thus simplifying the assembly procedure. Further simplifying the assembly procedure, is the provision for marking along both the top and bottom plates the location of the intermediate frame parts which are to be secured therebetween. The assembler, whether operating a semi-automated wall frame nailing machine or manually disposing the plates and intermediate parts on a layout table, for example as illustrated in FIG. 22, knows immediately the position of each of the intermediate frame parts along the plates without reference to externalities such as plans, layout drawings, etc. Furthermore, by differentially marking the plates to identify the intermediate parts as studs, corners, tees or openings, the assembler is provided information on the plates themselves whereby the various types of parts can be readily located in their proper position between the plates. This substantially eliminates errors which might otherwise be introduced in the formation of a wall frame.

It will also be appreciated that other devices, for example, stepping motors, could be employed in lieu of the binary cylinders described and illustrated herein. The electrical control system is particularly adapted to provide output control control signals for both the disclosed pneumatic air cylinders and a plurality of stepping motors which would serve the same function as the disclosed cylinders in locating the stop SP predetermined distances from a reference point along the cutting and marking table.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A machine for marking the location of a plurality of spaced parts along a plate in a wall frame comprised of elements including top and bottom plates and a plurality of parts disposed intermediate the plates, the machine comprising: a framework including a marking surface, a marking device for marking a plate carried by said surface, reference position means carried by said framework, means for relatively locating said reference position means and said marking device selected distances one from the other, means providing information representing the relative location of the intermediate frame parts along the one plate, means responsive to said information means and arranged in controlling relation to said locating means to relatively locate said marking device and said reference position means said selected distances one from the other, and means for actuating said marking device for marking the one plate at each of said selected relative locations of said reference position means and said marking device, said intermediate frame parts having various different functions in the frame, said marking device including a plurality of marking elements for applying discrete marking indicia to the one plate in accordance with the function served by the frame parts at their respective locations along the one plate, means providing information representing the functions of the various intermediate frame parts, and means arranged in controlling relation to said marking elements to apply selected separately identifiable and visible marking indicia to the one plate in accordance with the respective functions served by the frame parts at their corresponding locations along the one plate whereby the function of each intermediate part along the one plate is visibly identified on the one plate.

2. A marking device according to claim 1 wherein said marking elements include nozzles for applying variously colored sprays onto the one plate, and means carried by the marking device for delineating on the one plate the location of the intermediate parts and the areas therealong to be sprayed by the nozzles.

3. A machine for marking the location of a plurality of spaced parts along a plate in a wall frame comprised of elements including top and bottom plates and a plurality of parts disposed intermediate the plates, the machine comprising: a framework including a marking surface, a marking device for marking a plate carried by said surface, reference position means carried by said framework, means for relatively locating said reference position means and said marking device selected distances one from the other, means providing information representing the relative location of the intermediate frame parts along the one plate, means responsive to said information means and arranged in controlling relation to said locating means to relatively locate said marking device and said reference position means said selected distances one from the other, and means for actuating said marking device for marking the one plate at each of said selected relative locations of said reference position means and said marking device said framework including a cutting surface, cutting means for cutting lumber carried by said cutting surface, means providing information representing a predetermined length of the one plate, means responsive to said latter information means and arranged in controlling relation to said locating means to relatively locate said reference position means and said cutting means to establish the length of cut, and means for actuating said cutting means to cut the lumber to said predetermined length.

4. A marking device according to claim 3 including means for automatically unloading the one plate from said cutting surface, said unloading means being carried by said framework.

5. A marking device according to claim 4 wherein said reference means includes a carriage carrying a stop and movable relative to said cutting surface, said locating means including means for moving said carriage along said cutting surface relative to said marking device to locate said stop said selected distances from said marking device, said unloading means including a lumber discharge mechanism carried by said framework adjacent said marking device and a second lumber discharge mechanism carried by said carriage for movement therewith, said second discharge mechanism being adapted to unload from said cutting surface the end of the lumber adjacent said stop.

6. A marking and cutting device according to claim 3 including means providing information representing a predetermined distance between said reference position means and said cutting means to establish the distance between an end of the lumber and the location of a notch to be cut in the one plate at a location intermediate its ends, means responsive to said latter information means and arranged in controlling relation to said locating means to relatively locate said reference position means and said cutting means to establish the latter predetermined distance, and means for actuating said cutting means to notch the one plate intermediate its ends.

7. A marking device according to claim 6 wherein said latter information means includes a signal indicative of a notch cut, said latter actuating means including means for disabling the cutting means from cutting through the one plate in response to said signal.

* * * * *

UNITED STATES PATENT OFFICE
CERTIFICATE OF CORRECTION

Patent No. 3,820,502  Dated June 28, 1974

Inventor(s) Adolfo Castillo, Oscar Csakvary and John Calvin Jureit

It is certified that error appears in the above-identified patent and that said Letters Patent are hereby corrected as shown below:

Col. 2, line 6, "hardward" should read --hardware--.
Col. 6, line 51, "bottom" should read --bottom plate--.
Col. 8, line 52, "purpsoe" should read --purpose--.
Col. 9, line 43, "th" should read --the--.
Col. 12, line 11, "piston" should read --pistons--.
Col. 13, line 22, "lead" should read --head--; line 63, "disposd" should read --disposed--.
Col. 19, line 5, "instruction" should read --instructions--.
Col. 22, line 20, "provide" should read --provided--.
Col. 23, line 2, "binaty" should read --binary--; line 33, " - 13" should read -- - thirteen--.
Col. 24, line 47, "ard" should read --are--.
Col. 25, line 21, "Vavles" should read --Valves--; line 24, "part" should read --start--; line 56, "partitions" should read --partition--.
Col. 27, line 41-42, "member 10" should read --number 10--.
Col. 28, line 27, "thirteen-sixteenths in" should read --thirteen-sixteenths inch--.
Col. 29, line 2, "proided" should read --provided--; line 16, "by" should read --of--;
Col. 30, line 2, "f" should read --of--.
Col. 31, line 59-60, "accordance" should read --connection--.
Col. 33, line 26, "reresents" should read --represents--.
Col. 34, line 48, "thereof" should read --hereof--.
Col. 38, line 66, claim 5, "means" should read --position means--.

Signed and sealed this 7th day of January 1975.

(SEAL)
Attest:

McCOY M. GIBSON JR.
Attesting Officer

C. MARSHALL DANN
Commissioner of Patents